United States Patent
Sonnenberg

(10) Patent No.: US 10,521,089 B2
(45) Date of Patent: Dec. 31, 2019

(54) APPARATUS AND METHOD FOR PROVIDING A VIRTUAL DECORATING INTERFACE

(71) Applicant: Hunter Douglas Inc., Pearl River, NY (US)

(72) Inventor: Marko Sonnenberg, Pearl River, NY (US)

(73) Assignee: HUNTER DOUGLAS INC., Pearl River, NY (US)

( * ) Notice: Subject to any disclaimer, the term of this patent is extended or adjusted under 35 U.S.C. 154(b) by 582 days.

(21) Appl. No.: 14/634,409

(22) Filed: Feb. 27, 2015

(65) Prior Publication Data

US 2015/0242095 A1    Aug. 27, 2015

Related U.S. Application Data

(60) Provisional application No. 61/945,259, filed on Feb. 27, 2014.

(51) Int. Cl.
*G06F 3/048* (2013.01)
*G06F 3/0484* (2013.01)
(Continued)

(52) U.S. Cl.
CPC .......... *G06F 3/04842* (2013.01); *A47F 11/06* (2013.01); *G06F 3/0482* (2013.01);
(Continued)

(58) Field of Classification Search
CPC .............. G06F 3/0482; G06F 3/04842; G06F 17/5004; G06F 2217/02; G06F 2217/04; G06F 3/0481–0489
See application file for complete search history.

(56) References Cited

U.S. PATENT DOCUMENTS 7,257,548 B2 * 8/2007 Hathaway .......... G06Q 30/0282
                                                   705/26.63
7,293,368 B1    11/2007 Faulk et al.
(Continued)

FOREIGN PATENT DOCUMENTS

WO    2003/032205 A1    4/2003

OTHER PUBLICATIONS

Dreamdraper Quick Reference Guide, 2010, Evan Marsh Designs, Inc., PDF available at: https://www.dreamdraper.com/wp-content/uploads/2010/12/DreamDraper-Quick-Reference-Guide.pdf.*

(Continued)

*Primary Examiner* — Steven B Theriault
(74) *Attorney, Agent, or Firm* — Cohen & Holdebrand, PLLC

(57) ABSTRACT

The present disclosure provides embodiments of a method of providing a virtual window treatment decorating interface that comprises receiving, at a processor, window data pertaining to at least one window of a premises, providing a user interface for selection of a window treatment for the at least one window, rendering one of the at least one window in the user interface, the rendering being generated based on the window data, receiving a selection of a window treatment to be applied to the rendered window, and rendering the window treatment onto the rendered window in the user interface. Preferably, the method includes setting dimensions of the rendered window and window treatment to correspond to professional measurement data of the window to provide an accurate virtual visualization of the window with the selected treatment.

60 Claims, 16 Drawing Sheets

(51) Int. Cl.
*G06F 3/0482* (2013.01)
*A47F 11/06* (2006.01)
*G06F 17/50* (2006.01)

(52) U.S. Cl.
CPC ...... *G06F 17/5004* (2013.01); *G06F 2217/02* (2013.01); *G06F 2217/04* (2013.01)

(56) References Cited

U.S. PATENT DOCUMENTS

| | | | | |
|---|---|---|---|---|
| 7,309,015 | B2* | 12/2007 | Frantz | G06Q 30/02 235/462.46 |
| 7,523,411 | B2* | 4/2009 | Carlin | G06Q 30/02 345/419 |
| 7,661,959 | B2 | 2/2010 | Green et al. | |
| 7,783,525 | B2* | 8/2010 | Hathaway | G06Q 30/0282 705/26.1 |
| 7,946,488 | B2* | 5/2011 | Paquier | E06B 3/66 235/435 |
| 8,255,282 | B2* | 8/2012 | Hathaway | G06Q 30/0282 705/26.1 |
| 9,427,813 | B2 | 8/2016 | Begin et al. | |
| 9,767,502 | B2* | 9/2017 | Spellich | G06Q 30/0629 |
| 9,898,862 | B2* | 2/2018 | Bhattacharya | G06T 19/003 |
| 10,032,112 | B2* | 7/2018 | Blair | E06B 9/68 |
| 2001/0047250 | A1* | 11/2001 | Schuller | G06F 17/5004 703/1 |
| 2002/0006602 | A1 | 1/2002 | Masters | G09B 25/04 434/72 |
| 2002/0010655 | A1* | 1/2002 | Kjallstrom | G06Q 30/02 705/26.62 |
| 2002/0024479 | A1* | 2/2002 | Palmer | G06T 11/00 345/30 |
| 2002/0116254 | A1* | 8/2002 | Stein | G06Q 50/163 705/314 |
| 2004/0012542 | A1* | 1/2004 | Bowsher | G06T 15/00 345/10 |
| 2004/0122628 | A1* | 6/2004 | Laurie | G01C 15/00 703/1 |
| 2004/0197125 | A1* | 10/2004 | Unger | B41J 3/4078 400/76 |
| 2004/0255807 | A1* | 12/2004 | Xiong | A47H 2/00 101/483 |
| 2005/0033662 | A1* | 2/2005 | Buch | G06Q 30/02 705/27.2 |
| 2005/0044179 | A1 | 2/2005 | Hunter | |
| 2005/0091007 | A1 | 4/2005 | Lindenbaum | |
| 2005/0091008 | A1* | 4/2005 | Green | G06Q 99/00 703/1 |
| 2005/0110416 | A1* | 5/2005 | Veskovic | E06B 9/32 315/149 |
| 2005/0150409 | A1* | 7/2005 | McCarty | E06B 9/266 101/479 |
| 2005/0184143 | A1* | 8/2005 | Liu | B23D 23/00 235/375 |
| 2006/0184884 | A1* | 8/2006 | Chaturvedi | G06Q 10/10 715/751 |
| 2007/0198118 | A1* | 8/2007 | Lind | A41H 3/007 700/138 |
| 2007/0265927 | A1* | 11/2007 | Salter | G06F 17/5004 705/26.1 |
| 2008/0189386 | A1* | 8/2008 | Waldinger | G06Q 30/00 709/217 |
| 2010/0091015 | A1* | 4/2010 | Heidel | G06Q 30/06 345/419 |
| 2010/0205552 | A1* | 8/2010 | Iten | E06B 9/40 715/764 |
| 2011/0056353 | A1 | 3/2011 | Begin et al. | |
| 2011/0093357 | A1* | 4/2011 | Manley | G06Q 10/00 705/26.5 |
| 2011/0288818 | A1* | 11/2011 | Thierman | G01B 11/00 702/159 |
| 2014/0193039 | A1* | 7/2014 | Wexler | G01C 11/04 382/106 |
| 2014/0313203 | A1 | 10/2014 | Shugart | |
| 2014/0314276 | A1* | 10/2014 | Wexler | G06T 3/0012 382/103 |
| 2015/0186967 | A1* | 7/2015 | Madawala | G06Q 30/0621 705/26.5 |

OTHER PUBLICATIONS

Lin, et al., "Developing mobile 2D barcode/RFID-based maintenance management system", Automation in Construction, vol. 37, pp. 110-121, Jan. 1, 2014.

Notification of International Search Report, International Search Report and Written Opinion of the international searching authority in corresponding international application No. PCT/US2015/018144, dated May 11, 2015.

DreamDraper®, Interior Design Software, 8 pages, © 2009-2014 dreamDraper® <www.dreamdraper.com/index.php/room-elevations-slider> uploaded Oct. 8, 2014.

MinutesMatter, Studio Graphic Design Software, 8 pages, © 1999-2013 MinutesMatter <www.minutesmatter.com/products/studio-graphic-design-software> uploaded Oct. 8, 2014.

* cited by examiner

300

| | | |
|---|---|---|
| Date | 1/7/15 | ~302 |
| Address | 75 Cameron Rd Bethany, MO | ~304 |
| Room | Den | ~306 |
| Wall | SE | ~308 |
| Window Type | Triple-unit casement | |

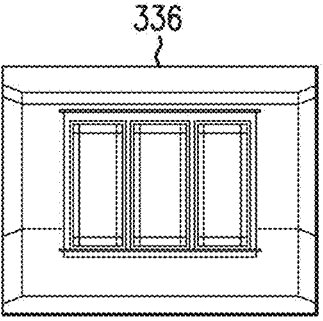
336

Dimensions

| | | | | |
|---|---|---|---|---|
| Well height | ~312 | Left edge to obstruction | ~322 |
| Well width | ~314 | Right edge to obstruction | ~324 |
| Well depth | ~316 | Top to floor | ~326 |
| Top to ceiling | ~318 | Bottom to floor | ~328 |
| Floor to ceiling | ~320 | Molding width | ~330 |

Features 332

Background: currently white paint
No damage/protrusion
Sml clearance between top molding and ceiling
Outlet located below window Y    N
Children  ◉  ◉ ~334

Measurer Initials  JL ~338

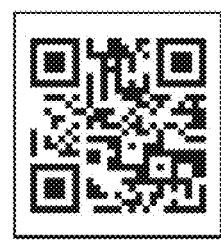
~340
Window QR Code

Next Window ~342    Complete/Send ~344

FIG.3

APPARATUS AND METHOD FOR PROVIDING A VIRTUAL DECORATING INTERFACE

CROSS-REFERENCE TO RELATED APPLICATION

The present patent application claims the benefit of priority to U.S. Provisional Patent Application Ser. No. 61/945,259, filed Feb. 27, 2014. The disclosure of the aforementioned patent application is incorporated by reference herein in its entirety for any purpose whatsoever.

FIELD OF THE DISCLOSURE

The present disclosure relates to providing an interface for virtual decoration, and in particular, relates to a virtual window treatment interface in which data, such as measurements, photographs, structural information, etc., on architectural openings are archived and recalled to facilitate the consideration and selection of window treatments or fashions and related products by a consumer, and also to facilitate communication between a merchant and a customer to provide intelligent direction and recommendations to the consumer.

BACKGROUND

Window fashions or treatments comprise a variety of devices and decoration applied to interior spaces on windows, such as blinds, shades, curtains, drapes, and shutters. While a variety of techniques exist for installation of such systems, there remains room for improvement. The present disclosure provides improvements over the state of the art, as described herein.

SUMMARY

In order to install treatments for architectural openings (hereinafter, "window(s)", for the sake of convenience and simplicity, without intent to limit) properly, precise and consistent measurements should be taken of all relevant window dimensions, including, without limitation, molding dimensions, clearance, discrepancies, and so forth. This process is error-prone for the less experienced, and better results occur when the measurements are made onsite by a professional assigned by a window treatment merchant or vendor (hereinafter merchant for the sake of convenience without intent to limit).

Another difficulty associated with window treatments is customer dissatisfaction with the way treatments look when they are installed on premises as there is sometimes a mismatch between the way a customer may have visualized a treatment versus how it actually looks amid the wall background and furnishings of a particular room. In addition, in extensive installations involving numerous treatments in multiple rooms, treatments are sometimes applied to the wrong windows because of insufficient identification between treatment components and the windows for which they are intended to be applied.

Applicant has come to appreciate that it would be desirable to provide a convenient process that is attractive to customers and alleviates all of the above-mentioned difficulties in measuring, selecting, and installing window treatments.

The present disclosure describes embodiments of a method of and apparatus for providing a virtual window treatment decorating interface that provides a memory unit with a database for retaining window data to facilitate virtual visualization of window treatments on a given window. In particular, various data pertaining to a window (and preferably all windows at the premises for which window treatments are to be installed), are stored in a database and are readily accessible for virtual visualization of the window with exemplary window treatments to facilitate selection of a window treatment for that window. Such data may include, without limitation, measurements of the window (e.g., height, width, and depth of the window and/or distance from the top of said window well to a ceiling, floor, or nearest obstruction); window shape; type or style of window (e.g., double-hung, casement, awning, picture, transom, slider, stationary, bay or bow, skylight, louvered, hopper, which may have different opening mechanisms if any); direction in which the window opens (if at all); manufacturer of the window; location of the window (e.g., the cardinal direction in which the window faces, the location of the window in the wall, or the location of the window in the room such as relative to other windows); number of windows the room, associated window hardware; desired type of mount (inside or outside); surrounding molding information (such as the width of the molding or style of the molding surrounding the window or the crown molding of the room); window environment (e.g., type or use of the room in which the window is located; and even decorative style or color scheme, such as paint colors or upholstery, or wallpaper style or colors, or furniture styles used in the room); and at least one photograph of the window (any and all such data, along with other data useful or relevant to virtual visualization of a window for selection of window treatment to be applied thereto, hereafter referenced generally as "window data" for the sake of simplicity and convenience without intent to limit) Because such window data is readily accessible by either a merchant or customer, an accurate virtual visualization of a window is readily achieved for superimposition of a virtual visualization of a selected window treatment thereon to permit accurate virtual visualization of the window treatment on the window to be treated. Such accurate virtual visualization significantly improves the ability to determine if the window treatment selection is appropriate and/or meets the consumer's needs for a given window. Moreover, because the database can store any and all window data, access to such window data is unnecessary as the application software, as described in more detail below, readily accesses the window data and populates (preferably automatically) the algorithm for creating the virtual visualization. Such window data may be maintained indefinitely so that the occupant of the premises or later occupants have a convenient manner of virtually visualizing window treatments without requiring any further window data to be gathered on the windows to be treated. Moreover, maintenance of such window data also facilitates virtual visualization by a merchant such as for providing such virtual visualization to a customer, for reviewing and/or assessing a customer's selection, and/or for providing advice or suggestions or other feedback to the customer.

In one embodiment, a method and apparatus facilitate virtual visualization of preferably an accurate depiction of the window as well as an accurate depiction of an exemplary window treatment (preferably selected from two or more exemplary window treatments) on the window. In one embodiment, the apparatus and method allow for receiving, e.g., at a processor, window data of at least one window of a premises, the window data optionally including a window identifier, such as an electronically-readable identifier;

selecting, via a user interface, a desired window for virtual visualization with an exemplary window treatment; rendering one of the at least one window in the user interface, the rendering being based on the window data of the at least one window; providing a user interface for selection of a window treatment for the at least one window; receiving a selection of a window treatment to be applied to the rendered window, and rendering the window treatment onto the rendered window in the user interface.

The present disclosure also provides embodiments of a method of and apparatus for enabling a virtual window decorating interface with a database of window data relating to some or all windows in a user's home, and corresponding such information with information pertaining to exemplary window treatments. A mobile device, such as an electronic device, or other input device may be used which allows for the input of user data into a data entry interface on the input device. After collection of window data (such as by a physical or electronic measuring device ("measurer")) for at least one window at a premises of a customer, the data entry interface allows for entering/uploading/transmitting and storing of the window data, and transmitting the window data to a server supporting a web site interface, such as via the mobile electronic device, wherein the web site interface enables the customer to preview window treatments rendered in accordance with the window data pertaining to the at least one window of the premises. Optionally, the method and apparatus further includes tagging the at least one window for which window data has been gathered with a window identifier, such as an electronically-readable identifier, and optionally photographing the identifier, such as with the mobile electronic device.

The system and apparatus of the present disclosure also allows for receipt of uploaded images from the customer database (e.g., window data in the form of pictures taken by the measuring device) for storing in the field information/communication module to aid in the formulation of window treatment recommendations to customers. Window data such as professional measurement data uploaded to the data entry interface is stored in the database of the memory unit for use by the retailer in optimizing window treatments for a user's home. The window data, such as professional measurement data, that is stored in the database also facilitates substantially accurate virtual visualization of window treatments on windows within the database as seen by the user interface. It will be appreciated that use of window data, such as combining professional measurement data with any images of the windows uploaded to and stored in the database, readily permits a recommendation engine in the application to recall window data input and stored in the database for rendering one more windows by selecting optimal window treatments for a given window. The recommendation engine is configured to recall all relevant window data for one or a set of windows, including, without limitation, the shape, size, and color scheme of the windows, type and size of the room, and the type of window treatments in other nearby rooms to provide recommendations for the optimal window treatments for each particular window. For instance, the recommendation engine may be able to review a customer's selection and to provide advice and/or recommendations to the customer, such as based on other information retained in the database (e.g., whether there are any obstacles such as handles that would interfere with the selected window treatment, if the mount type is optimal, if the window treatment is appropriate for the type or decorative style of the room, etc. It will be appreciated that the recommendation engine is optional, and the user may, of course, make his or her own selections of window treatments (or select those recommended by the professional), where the selected window treatments can be recalled by the application from the window treatment database in the memory unit, to enable the customer to virtually visualize the selected window treatments on the rendered windows in the user interface, without the use of the recommendation engine.

Other features and advantages of the present disclosure will become apparent from the following description that refers to the accompanying drawings.

BRIEF DESCRIPTION OF THE DRAWINGS

The disclosed embodiments will now be described in greater detail in the following detailed description with reference to the drawings in which:

FIG. 3 is an exemplary data entry interface screen for capturing professional window measurement data at a customer premises according to an embodiment of the present disclosure;

DETAILED DESCRIPTION

Figure 1:
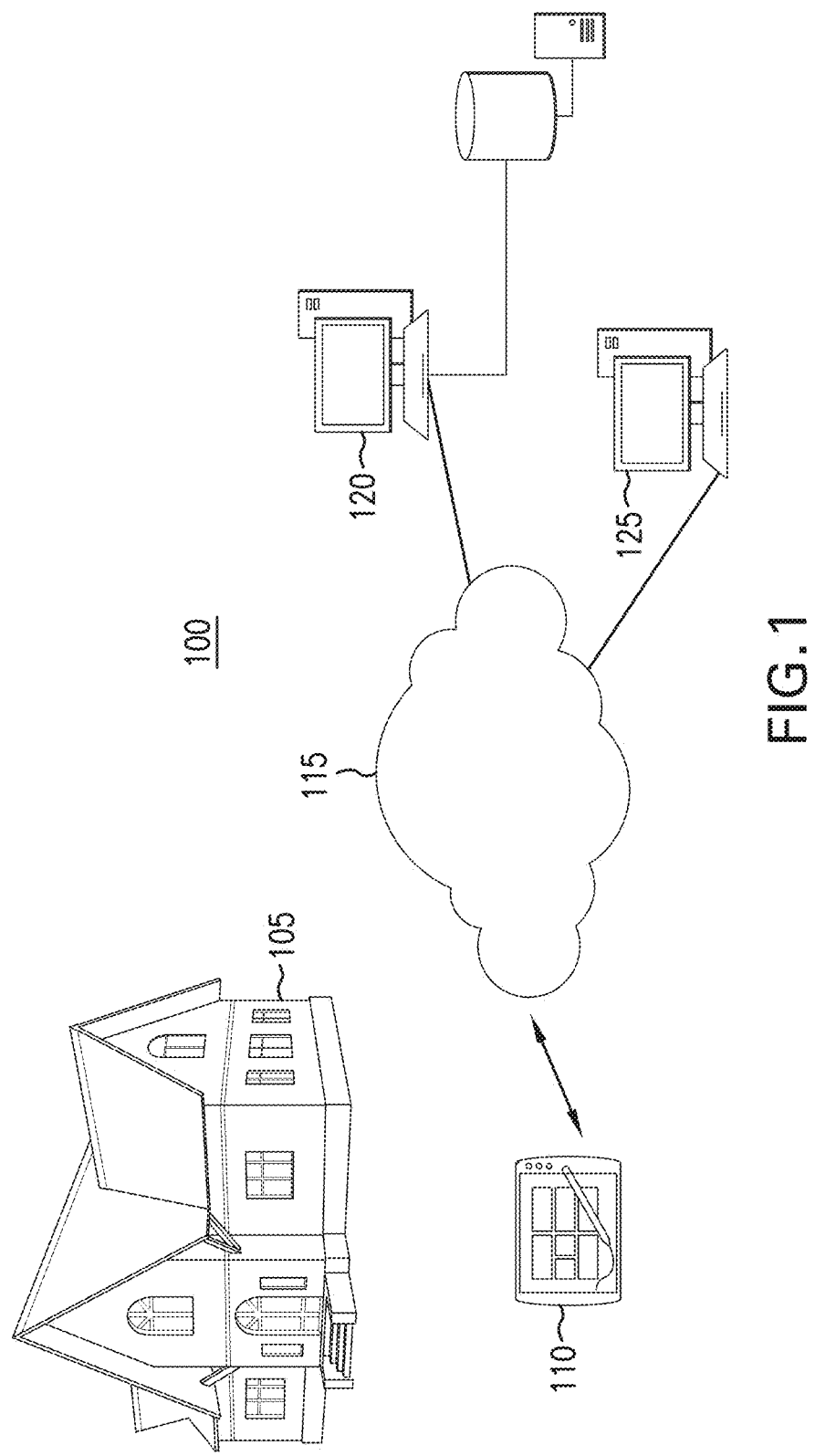
FIG. 1 is a schematic diagram of a system for window data collection and storage according to an embodiment of the present disclosure.

The foregoing summary, as well as the following detailed description of the embodiments of the present disclosure, is better understood when read in conjunction with the appended drawings. For the purposes of illustrating the disclosed embodiments, there is shown in the drawings an embodiment that is presently preferred, in which like numerals represent similar parts throughout the several views of the drawings, it being understood, however, that the disclosure is not limited to the specific methods and instrumentalities disclosed.

It is to be understood that the singular forms "a," "an," and "the" include plural referents unless the context clearly dictates otherwise. In addition, when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

The present disclosure provides embodiments of a method of and apparatus for providing a virtual window treatment decorating interface that provides a memory unit with a database for retaining window data to facilitate virtual visualization of window treatments on a given window. According to some embodiments of the present disclosure, a customer contacts a windows treatment merchant (hereinafter referred to as "Merchant") to set up an appointment to have the windows of his or her premises professionally measured (the premises may be a home, office, or any other building having windows for which decoration may be desired). The customer may contact the Merchant in any desired manner, such as by phone, or by accessing the Merchant via a website and setting up an appointment through the website. When setting up the appointment, the customer may also register with the Merchant to create an account, such as by providing or entering via the website basic information including name, premises address, and contact information.

According to one embodiment of the present disclosure, the Merchant assigns a trained and equipped professional to gather relevant window data pertaining to at least one window, and preferably all windows, at the customer's premises. Preferably, the professional at least conducts a complete measurement of all of the windows at the customer's premises using manual and/or automatic measurement techniques. In a further embodiment, window measurement information can be obtained by the Merchant from an architect of the customer's premises or a professional builder that built the residence. The window measurement information collected by the professional or electronic measuring device can be entered or transmitted to an application which may conveniently run on a mobile device which the professional can carry during measurement appointments. In some embodiments the measurements can be entered onto an input screen automatically via a Bluetooth-enabled measurement device, such as an electronic measurement device, or the information from the physical measurer can be manually input into the application as measurements are made. According to some embodiments, the professional may take photographs of any or all of the windows, and the photographs can be input and uploaded into the interface (including automatically uploaded by an electronic measurement device) for storage in a database of the memory unit of the application and use in conjunction with the window data, or photographs can be taken by the professional and manually input into the interface. For any given window, a copy of a photograph taken of the window may be automatically ported into an open field of a data input interface screen of the application along with other associated window data. It will be appreciated that the window data to be used to render a virtual visualization as described herein need not be gathered or generated by a professional, but may, instead, be gathered or generated by the customer himself/herself and entered into the field information/communication module of the application for use with the method and apparatus described herein.

After entering all of the relevant window data for a window, the professional may affix a window identifier, such as a temporary identifier, such as a removable sticker, which may bear a Quick-Response (QR) code, RFID tag, Near Field Communication ("NFC") tag, or other electronically readable identifier to a part of the window frame or molding, such as to indicate that data gathering on that window has been completed. The professional could also put a window identifier, such as a small sticker, in each window to provide further information or guidance. For instance, the window identifier may say "professionally measured. Go to www.yyy.com to view and order your window coverings," which would allow customers to view their windows and potential window treatments on the web interface module 508 (described in more detail below). A photograph of the window identifier may be taken and similarly ported into the data input interface of the application, and stored in the database for recall at a later time to easily and quickly identify a specific window and its corresponding window data. Once the professional has completed entering window data for windows at the premises, the application may upload all of the entered window data to a database maintained by or otherwise accessible by the user interface. Thus, the window identifier will become linked to the database; any time the window identifier is scanned, the processor will recall the relevant window data from the database for viewing on the user interface. If the window identifier is an electronically-readable identifier, the mobile device running the application can automatically upload the photograph of the identifier into the database for storage and recall at a later time. If the customer has not yet registered with the Merchant, receipt of the window data at the database may trigger an auto-registration process in which a customer account is created and the window data is linked to the account. Window data entered to the application is preferably stored in the database and maintained by the Merchant for future use, i.e., when a user chooses to replace the window treatment, so that preferably all of the necessary and unchanged information and window data is already provided.

According to some embodiments, once the window data has been uploaded and incorporated into a customer account, the customer can access a window treatment rendering application provided on the Merchant website. Using this application, a customer can choose to preview realistic versions of selected treatments that are fitted to the customer's own window specifications. In some embodiments, the rendering application may base the renderings on the photographs of the windows taken by the electronic measurer, rendering selected treatments onto the photographs, with suitable adjustments and effects to generate a realistic appearance. In other embodiments, the rendering application uses window dimension data and renders both a simulated window with a simulated window treatment. If desired, the system can access databases of professional window manufacturers to match the photographed window with a product name and/or model number to simulate an exact replica of the window for the customer's benefit. Other databases may be accessed to provide accurate virtual visualization of the window, and/or its surroundings, such as paint color, to match the room color with the window treatment color, or upholstery of the furniture in the room to match the window treatment material therewith. The system is configured to recall any amount of retained and stored window data from the database to use in rendering windows for a user and optimizing recommendations.

Through the Merchant website, the customer may select one or more treatments for order and set up an appointment for installation. As preparation for installation, each window treatment can be tagged with the corresponding identifier of the window to which it corresponds. This feature reduces the chances of errors during installation. Taken together, the processes according to the present disclosure ensure precision, provide convenience, and enhance the customer's interior decorating experience.

Referring to FIG. 1, an exemplary system 100 for window data collection and storage according to an embodiment of the present disclosure is shown. A professional assigned to take window data of windows at premises 105, such as professional measurements of windows at premises 105, can be equipped with a measurer (such as a physical tool, not shown in the FIGS.) and a mobile device 110 configured with an application for receiving and storing window data describing the windows on the premises. In a preferred embodiment, the mobile device may serve as both the measurer and the application interface. The mobile device may comprise any portable computing device including a smartphone, personal digital assistant (PDA), tablet PC, iPad, laptop computer, or the like, and use any operating system such as Android, iOS, or Sailfish OS. Applications on the mobile device 110 may be programmed using Java, Javascript, C, C++, or any other commonly-supported language suitable for a mobile device environment. The mobile device 110 includes communication hardware (chipsets, encoders, antennas, etc.), software, and/or firmware enabling communication via a public or private wireless network with the Internet, collectively referred to herein as the "Cloud" 115. A database server 120 maintained by or otherwise accessible by the Merchant (e.g., a cloud server) can also be communicatively coupled to the Cloud 115. When data is entered into the application on mobile device 110, the application is configured with necessary authorization codes, URI address data, and data encoding instructions for uploading the entered data to the database server 120 via the Cloud 115. The database server 120 may support a mobile-friendly database platform such as SQL Lite or SQL Server Compact. Data uploading to the database server 120 may be stored in any database 125 communicatively coupled to the database server 120. An application server 125, such as a web server, that hosts a Merchant website is operatively coupled via the Cloud or via private network (not shown in FIG. 1) with the database server 120 to receive data therefrom.

Figure 2:
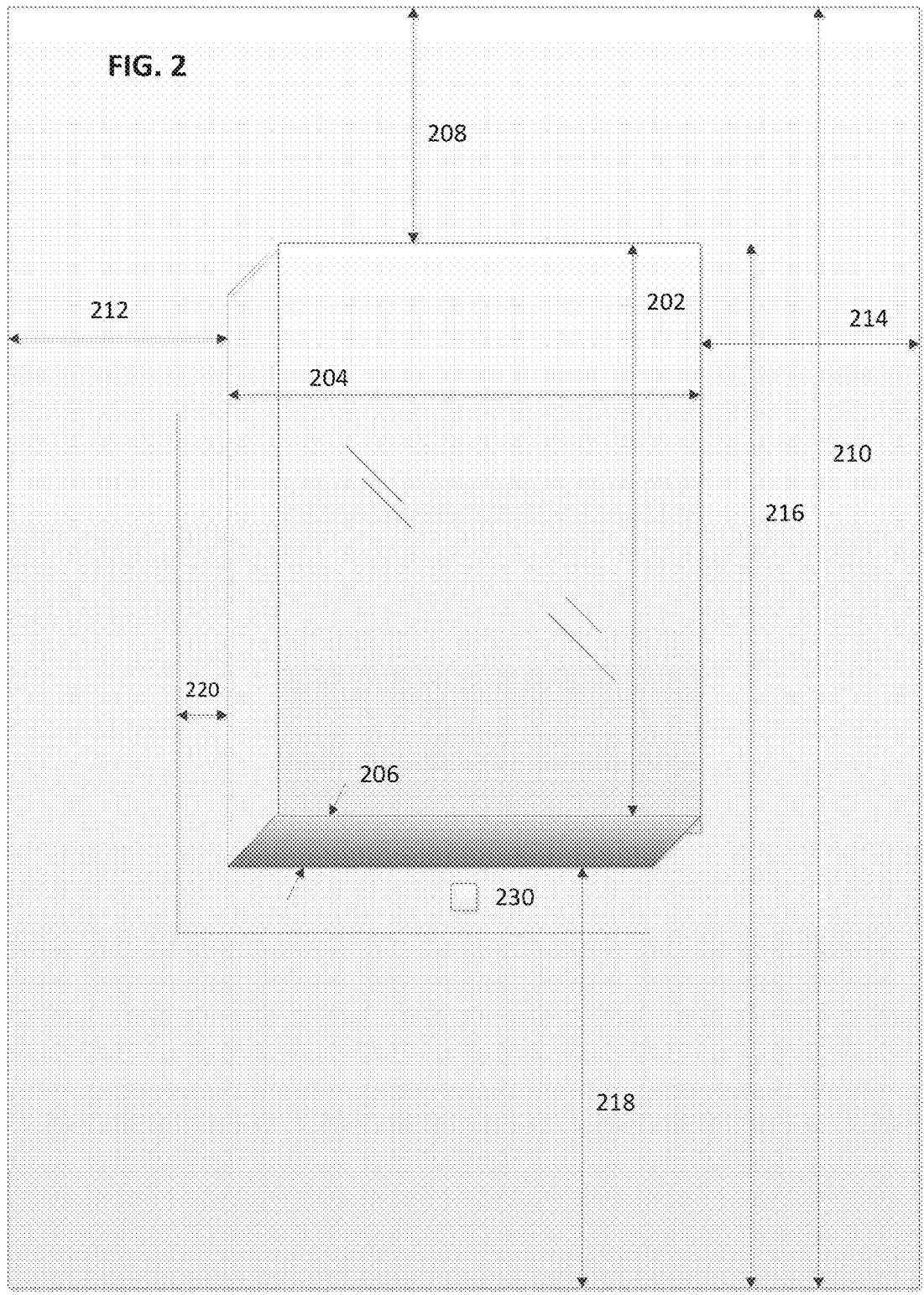
FIG. 2 is a diagram showing exemplary dimensions of a window that are professionally measured according embodiments of the present disclosure.
Figure 4:
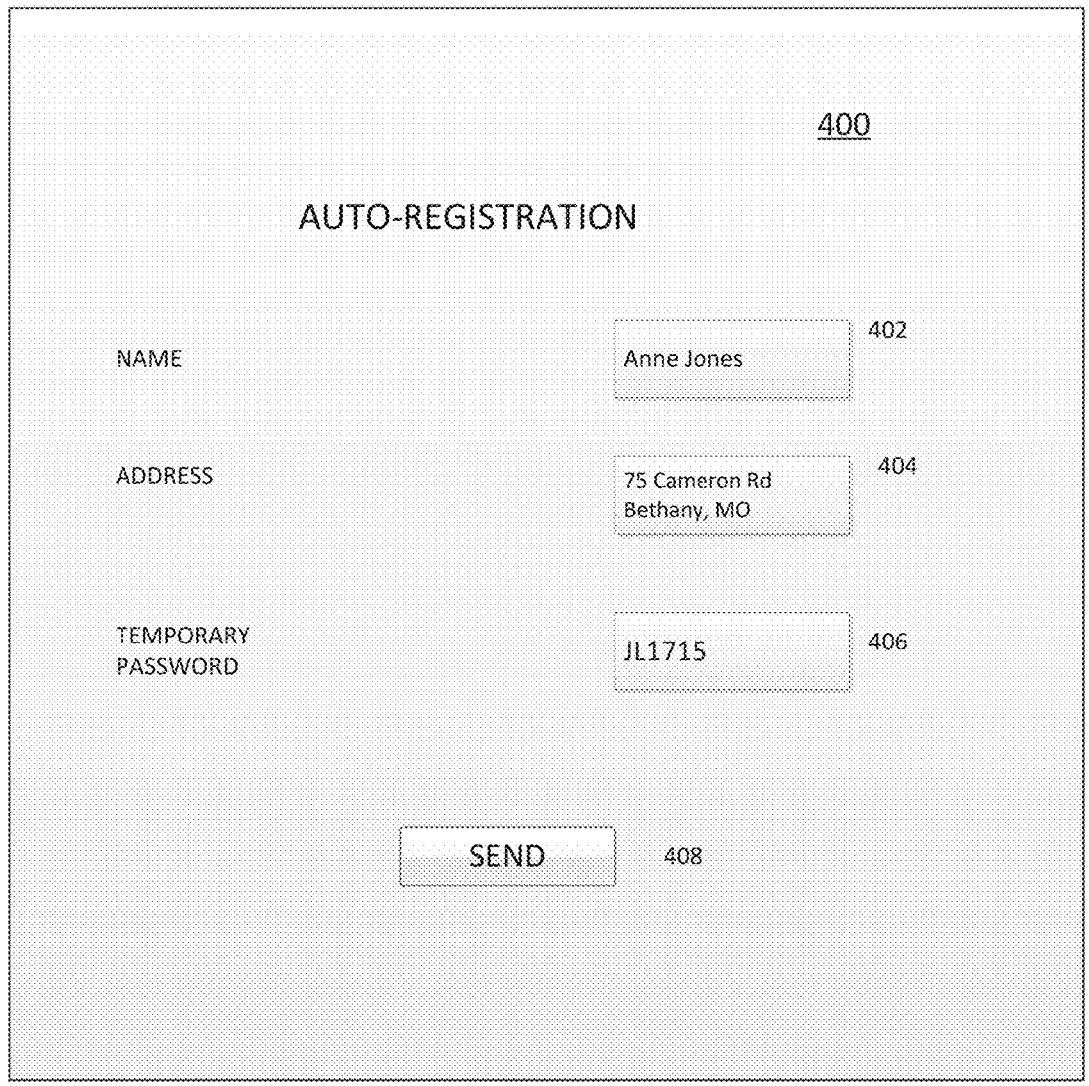
FIG. 4 is an exemplary auto-registration data entry screen according to an embodiment of the present disclosure.

At a window measurement appointment, an assigned window professional arrives on the premises 105 and begins to collect window data, such as by taking measurements of windows using the measurer, starting at an arbitrary "first" window for example, on a ground floor. FIG. 2 illustrates an exemplary window well 200 (the term "well" denoting that the window has a depth as well as height and width) pointing out specific dimensions that are precisely measured according to some embodiments of the present disclosure. Among the dimensions are the height 202, width 204, and depth 206 of the window well; the distance from the top of the window well to a ceiling, crown, border, or beam 208; the total distance from the floor or baseboard to ceiling, crown, border, or beam 210; the distance from the left edge of the window well to the nearest obstruction to the left of the window 212 (the nearest obstruction may be another window, a wall, furniture, etc.); the distance from the right edge of the window well to the nearest obstruction to the right of the window 214; the distance from the top 216 and bottom 218 of the window well to floor or baseboard; and, where applicable, a width 220 of a molding surrounding the window well. A physical measurer may use conventional techniques, such as manual tape measure readings, or electronic distance measurement devices can be used such as digital tape measures, laser devices, and the like. In some embodiments, the mobile device 110 may also function as the measurer and may have an accurate distance measurement application based on, for example, inertial accelerometer sensors. When the mobile device 110 also functions as the measurer, the distance measurement application is configured to transmit uploaded window data automatically to the database for storage therein and recall at a later time.

Also shown in FIG. 2 is a window identifier 230 which may include an electronically readable code mark such as a QR code or bar code. The window identifier 230 may be placed on any surface on or adjacent to the window well 200 and is used to indicate that the professional has completed gathering window data pertaining to the particular window. The window identifier 230 could alternatively be an RFID tag, Near Field Communication ("NFC") tag, or any other electronically readable identifier which can link to the database of the memory unit. For ease of explanation, the window identifier 230 will be generally referred to as a QR code, but it is envisioned that any other electronically readable identifier could be used.

In some embodiments, prior to the appointment, the Merchant may generate a group of unique identifiers (e.g., 10-30, depending on the anticipated size of the premises) to be applied to the windows. In some implementations, in which the QR codes are used as the identifiers, the Merchant may generate a QR code using the XML data. For example, the merchant server may utilize the PHP QR Code open-source (LGPL) library for generating QR Code, 2-dimensional barcode, available at http://phpqrcode.sourceforge.net/. For example, the merchant server may issue PHP commands similar to the example commands provided below:

```
<?PHP
header('Content-Type: text/plain');
// Create QR code image using data stored in $data variable
QRcode::png($data, 'qrcodeimg.png');
>
```

Information such as the name or address of the customer can be incorporated into the QR codes. The Merchant may affix the codes to stickers or other markers and provide them to the assigned window professionals.

The window data gathered by the window professional, such as each of the measurements 202-220 taken by the window professional, are entered into a data entry interface of the application on mobile device 110 (either automatically transmitted by the distance measurement application or manually entered by the professional). An exemplary embodiment of the data entry interface 300 for an individual window according to the present disclosure is shown in FIG. 3. It is noted that data may be input manually by the window professional, or, where measurements or other data is obtained electronically by the measurer, data may be entered automatically at the cursor location in the data entry interface 300. The data entry interface 300 includes a number of input boxes or fields, including a current date field 302, and an address field 304 for the address of the premises. The date and address fields 302, 304 may be entered once and then copied to the further data entry screens of additional windows. Further fields include a room field 306 indicating the room in which the window is located, the direction of the wall 308 bearing the window with respect to a person facing the window, a window type 310, and other fields corresponding to other types of window data helpful or necessary for virtual visualization of a window as described herein. The window type, such as casement, bay, arched, awning, etc., generally indicates the general shape, and also indicates the mechanism by and/or direction in which the window is opened and closed.

As shown, beneath fields 302-310 there is a dimensions section in which the data taken from the measurements shown in FIG. 2 may be entered in the interface 300. The dimension fields can include the corresponding window height 312, window width 314, window depth 316, top of window well to ceiling 318, floor to ceiling 320 (room height), left edge of window well to nearest obstruction on the left 322, which may be another window, a wall or furniture item, right edge of window well to near obstruction on the right 324, top to floor 326, bottom to floor 328, and molding width 330.

Below the dimension section is a Features field box 332 in which the window professional may add additional information useful for describing the window or the window environment. Such window data may include the colors or patterns of the paint or wallpaper surrounding the window, whether the window well surfaces have suffered any damage or have any protrusions, notable features for installation such as clearance dimensions, amount of sunlight entering the particular windows, and the types of items located adjacent to the window (e.g., furniture, fixtures, electrical outlets, etc.). All of these features may be helpful to installers and may also enable the Merchant to recommend treatments suited for the particular window. Some of these features may also be captured by photograph, but they may also be added by the window professional in the Features field 332 as a useful backup. A children present radio button 334 is used to indicate whether there are any children living in or are expected to enter the premises. This information may be necessary for determining how pull-cords of various window treatments are to be arranged to prevent children from potentially hazardous encounters. As noted, the window professional may also take one or more photographs of the window using mobile device 110 and automatically upload the photographs to the application database, or a photograph can be taken using an independent device and sent to the mobile device 110. The photograph may be captured and saved, for example, as a tiff or jpeg file, automatically copied from its storage location and then pasted into a photo field 336 in the data entry interface 300. Below the children present radio button 334 is an initials field 338 in which the window professional enters his or her initials for confirmation and other purposes.

In addition to photographing the window, in some embodiments, the window professional also takes a photograph of the window identifier temporarily affixed to the window. The photograph can be saved on the mobile device 110 and a copy may be automatically pasted into an identifier photo field box 340. In this manner the window identifier, such as a QR code is stored as window metadata along with the other information pertinent to the window.

Other items in the data entry interface shown in FIG. 3 include a next window button 342 for switching to a new screen for inputting information of another window in the same room, a next room button, and a complete/send button 344. When the next window button 342 is activated, the data within the current screen may be saved locally on the mobile device 110 before switching to a new screen. The complete/send button may be activated by the electronic measurer or the professional when all of the window on the premises have been measured, or may be activated only upon direct prompting. Upon activation, all the window information that has been previously saved and the information in the current screen is uploaded to the database server 120. In some embodiments, prior to uploading the application may collate the input information along with field identifiers so that the information may be parsed.

Either prior to or after completing the window data gathering, the window professional may determine whether the customer has registered with the Merchant. If the customer has not yet registered, the interface may activate an auto-registration data entry screen 400 that includes fields for the customer name 402, address 404, and a temporary password 406 to access features at the Merchant website. In one convenient embodiment, the temporary password is set to a concatenation of the window professional's initials and the date of the appointment, and the customer is given the temporary password. Once the information is entered, the window professional may activate a send button 408 which generates a command to send the information, which may be specifically tagged to indicate that the information is accompanied by an auto-registration request, to the database server 120.

Figure 5:
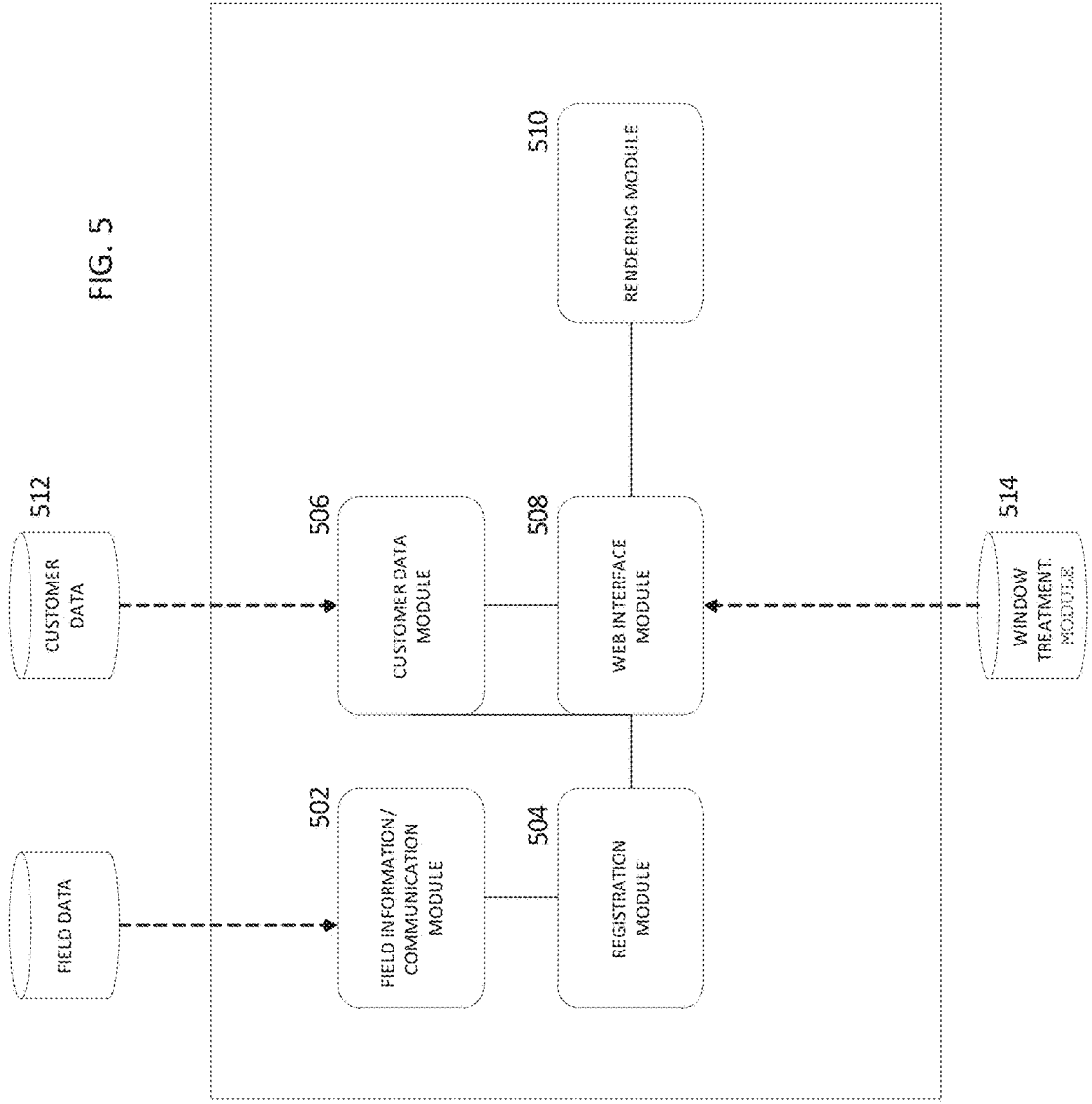
FIG. 5 is a schematic block diagram of software modules used in the virtual window decorating interface according to an embodiment of the present disclosure.

The Merchant web server 125 uses various software application modules to provide a virtual window decoration experience to the customer. The web server 125 may load and execute the software modules locally or they may be executed in a distributed computing environment. FIG. 5 is a schematic diagram of an embodiment of a software module system 500 for providing a virtual decorating interface according to the present disclosure. Module System 500 includes a field information/communication module 502, a registration module 504, a customer data module 506, a web interface module 508, and a rendering module 510. The field information/communication module 502 is operative to establish communication sessions via known secure socket layer (SSL) with database server 120 (FIG. 1) to access and to download window data previously uploaded by field personnel (e.g., the window professional assigned to the premises), such as the window measurement data obtained by the assigned window professionals on site. The field information/communication module 502 parses incoming window data to separate out window data according to customer name or premises address, and determines if the window data is accompanied by an auto-registration request. If the window data is accompanied by an auto-registration request, the window data is passed with an instruction to the registration module 504, and if the window data does is not accompanied by an auto-registration request, the field information/communication module 502 delivers the separated (delimited by customer) window data to the customer data module 506. The registration module 504 comprises one or more applications which, upon receiving incoming data from the field information/communication module 502, can automatically create a new customer account with the Merchant. The account may be a database record established with initial customer name, address, and the temporary password fields. After the registration module 504 generates a new account, the account is sent to the customer data module 506 which stores the new account along with the associated window measurement data.

Figure 6:
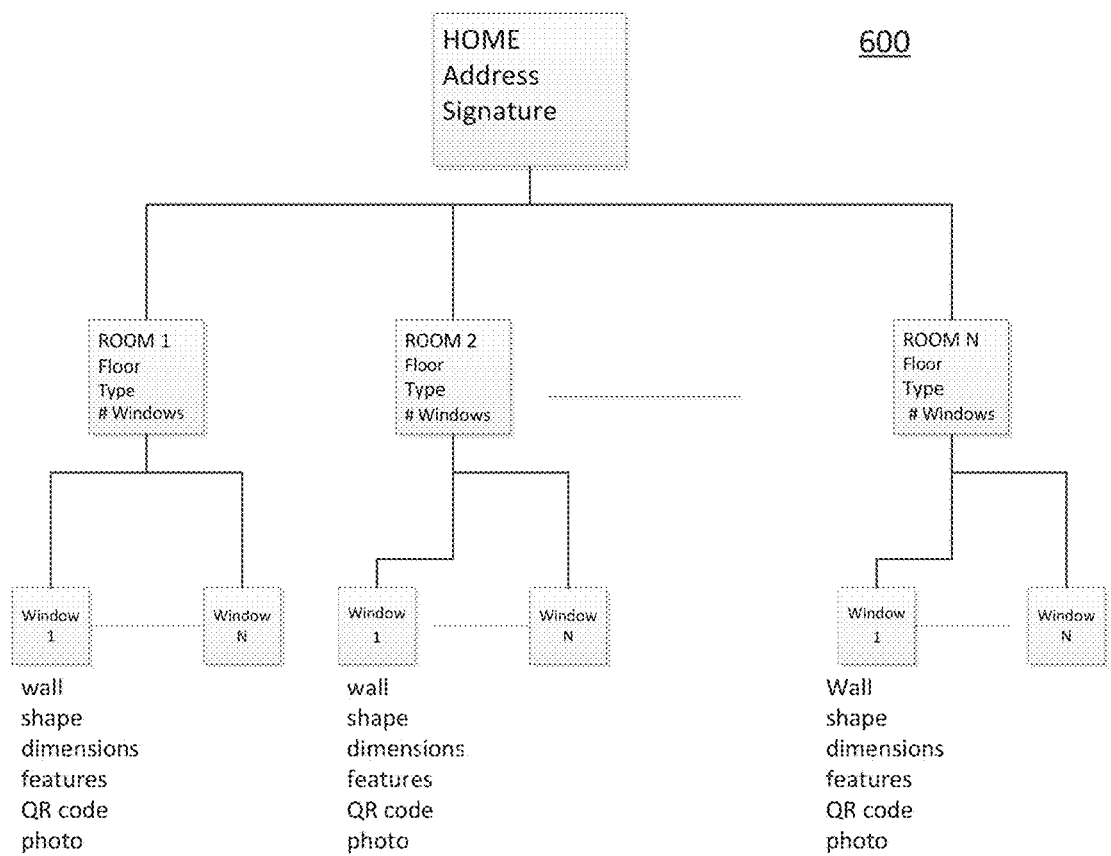
FIG. 6 is a schematic diagram of an exemplary data structure for organizing window measurement data according to an embodiment of the present disclosure.

The customer data module 506 runs applications that retrieve and store customer related window data with a customer database 512. The customer database 512 stores the window data of all customer accounts including any window data collected from the premises of the customer. The customer data module 506 may generate a data structure from the customer data as illustrated in FIG. 6. The data structure 600 is a hierarchical structure: the highest level (Level 1) is a premises address, Level 2 levels comprises various rooms that are linked to the address, Level 3 comprises windows that are linked to particular rooms, and the bottom Level 4 comprises data linked to particular windows. In this manner, the window data pertaining to a particular window is linked to the window, which is in turn linked to a room, which is in turn linked to a premises, so that any window data has metadata pertaining to all levels of the data structure. Through the data structure 600, the customer data module 506 creates and stores a model of the premises that is useful for virtual visualization and decoration.

The web interface module 508 includes one or more applications that generate content available on the website of the Merchant, including various screens that present options to the visitors of the website and receive input. The web interface module 508 may execute instructions in e.g., HTML, XML, Java programming languages to deliver such content in the form of web pages. The web pages may comprise a user interface screen through which a visitor may activate various virtual decoration and ecommerce options presented by the Merchant web site. The web interface module 508 receives and communicates with customer information from the customer data module 506. For instance, a web page presented by the web interface module 508 may include a customer login prompt. The web interface module 508 receives credentials entered through the login prompt and may deliver the information to the customer data module 506 which may commence a matching search through the customer database 512 to determine whether the credentials match a customer account. If so, the customer data module 506 may load and deliver detailed customer data to the web interface module 508. The web interface module 508 also interacts with the rendering module 510, which includes graphics applications for generating graphics directly from files (e.g., jpeg, tiff) and for generating new graphics based on rendering algorithms, typically in combination with file data. The rendering module 510 receives data from a window treatment module 514—which includes files containing window treatment graphics content, such as photographs, renderings, or rendering instructions (e.g., template data) for shades, blinds, curtains etc.—as well as window data from field information/communication module 506, for rendering virtual visualizations of the one or more windows with selected window treatments. As described in greater detail below, the rendering module 510 is adapted to generate virtual visualizations in conjunction with instructions received from the web interface module 508 using window treatment graphics files loaded from the window treatment database, customer data from the customer data module 506, and window data from field information/communication module 506, allowing users to see accurate virtual representations of various window treatment options for a given window through the web interface module 508, thereby aiding in the selection process. Through the web interface module, a user can preferably alter variables relating to the window, such as the color scheme in a room, the type of furniture present, or amount of natural light coming through the window at different times of the day. Because the web interface module 508 receives and communicates with customer information from the customer data module 506, the virtual representations of various window treatment options are virtually represented on accurate depictions of the window for which the consumer is selecting the window treatment. Such accurate depiction facilitates and optimizes the window treatment selection process. As will be described in more detail below, the web interface module 508 may work in conjunction with a recommendation engine of the application to provide optimal window treatment options which can then be visualized by the consumer.

Figure 7:
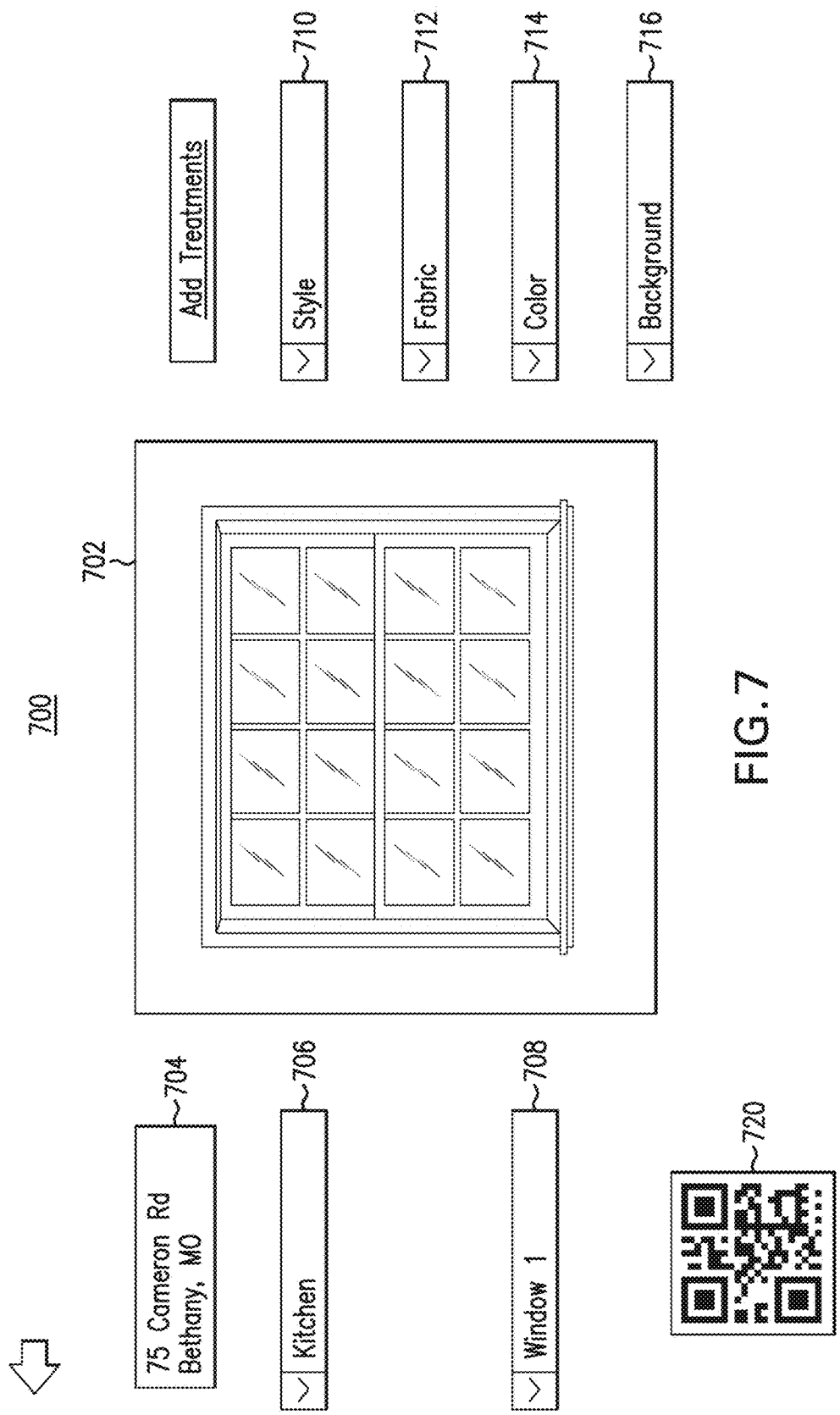
FIG. 7 is an exemplary user interface screen presented by the Merchant web site for virtual window treatment preview according to an embodiment of the present disclosure.

FIG. 7 is an exemplary user interface screen 700 presented by the Merchant web site for virtual window treatment preview according to an embodiment of the present disclosure. A customer may communicate with the Merchant web server 125 using a client device such as, but not limited to: a personal computer, mobile device, television, point-of-sale terminal, kiosk, ATM, and/or the like (e.g., 402). FIGS. 12-15 illustrate an embodiment of eCommerce communication between client device 1202 and Merchant web server 125, including third party payment communications. For example, the user may provide user input, e.g., page request input 1211, into the client device 1202 indicating the user's desire to request a page, or purchase a product after having interacted with a website implementing a virtual window decoration user interface, as discussed further below. For example, a user at a desktop station or in transit may submit a request for a page, for example, by typing or copying a URL into a browser, by clicking or touching on an object, or the like. The client device 1202 may then generate a page request, e.g., 1212, and provide the page request to the Merchant web server 125. For example, the client device 1202 may provide a (Secure) Hypertext Transfer Protocol ("HTTP(S)") GET message including the page details for the behavior adapter server in the form of data formatted according to the eXtensible Markup Language ("XML"). Below is an example HTTP(S) GET message including an XML-formatted page request for the Merchant web server:

```
GET /<<[name]>> HTTP/1.1
Host: <<host.com>>
User-Agent: Mozilla/5.0 (Macintosh; Intel Mac OS X 10.7; rv:8.0) Gecko/20100101 Firefox/8.0
Accept: text/html,application/xhtml+xml,application/xml;q=0.9,*/*;q=0.8
Accept-Language: en-us,en;q=0.5
Accept-Encoding: gzip, deflate
Accept-Charset: ISO-8859-1,utf-8;q=0.7,*;q=0.7
Referer: <<http://www.host.com/snweb >>
Cache-Control: max-stale=0
Connection: Keep-Alive
X-BlueCoat-Via: b629d7b84667d49e
```

In some implementations, the Merchant web server 125 may obtain the page request from the client device 1202, and extract the page detail (e.g., XML data) from the page request. For example, the Merchant web server 125 may utilize a parser such as the example parsers described below in the discussion with reference to FIG. 16. After a customer has set up an account with the Merchant and has had window data gathered with respect to the windows of his or her premises (e.g., professionally measured, photographed, etc.), when the customer logs on to the Merchant web site, the customer will have access to the window treatment preview options including those shown in FIG. 7. In the center of interface screen 700 is a display area in which a graphical representation 702 of one of the windows of the customer's premises 704 (indicated at the top left) is displayed. In some embodiments, the representation is a photograph taken of the window, and in others it is a graphical rendering based on the measured dimensions and window type. The window representation shown in FIG. 7 is a "before" representation illustrating the window before any treatments are added, such as shown in the photographs taken and uploaded by the professional. The particular window displayed can be adjusted by the user using the room 706 and window 708 drop-down lists on the left, the room drop-down list 706 including selections corresponding to the various rooms in the premises 702, and the window drop-down list 708 including selections corresponding to the room selected in a manner according to the hierarchical data structure 600 created for the premises.

On the right side of interface screen 700 are options for changing the displayed representation 702 to include window treatments and optionally alter the background. A style drop-down list 710 includes selections of window treatment style such as different shades, blinds, curtains, drapes, etc., a fabric drop-down list 712 includes selections of different fabric materials and patterns corresponding to the style selected, a color drop-down list 714 includes selections of various colors corresponding to the fabric selected, and a background drop-down list 716 includes selections of various paint colors/wallpaper designs for the background surrounding the window. The drop-down lists 710, 712, 714 may activate pop-up windows or other features to display further options as known to those skill in web design. The identifier 720 associated with the particular window displayed is also shown at the bottom left.

Figure 8:
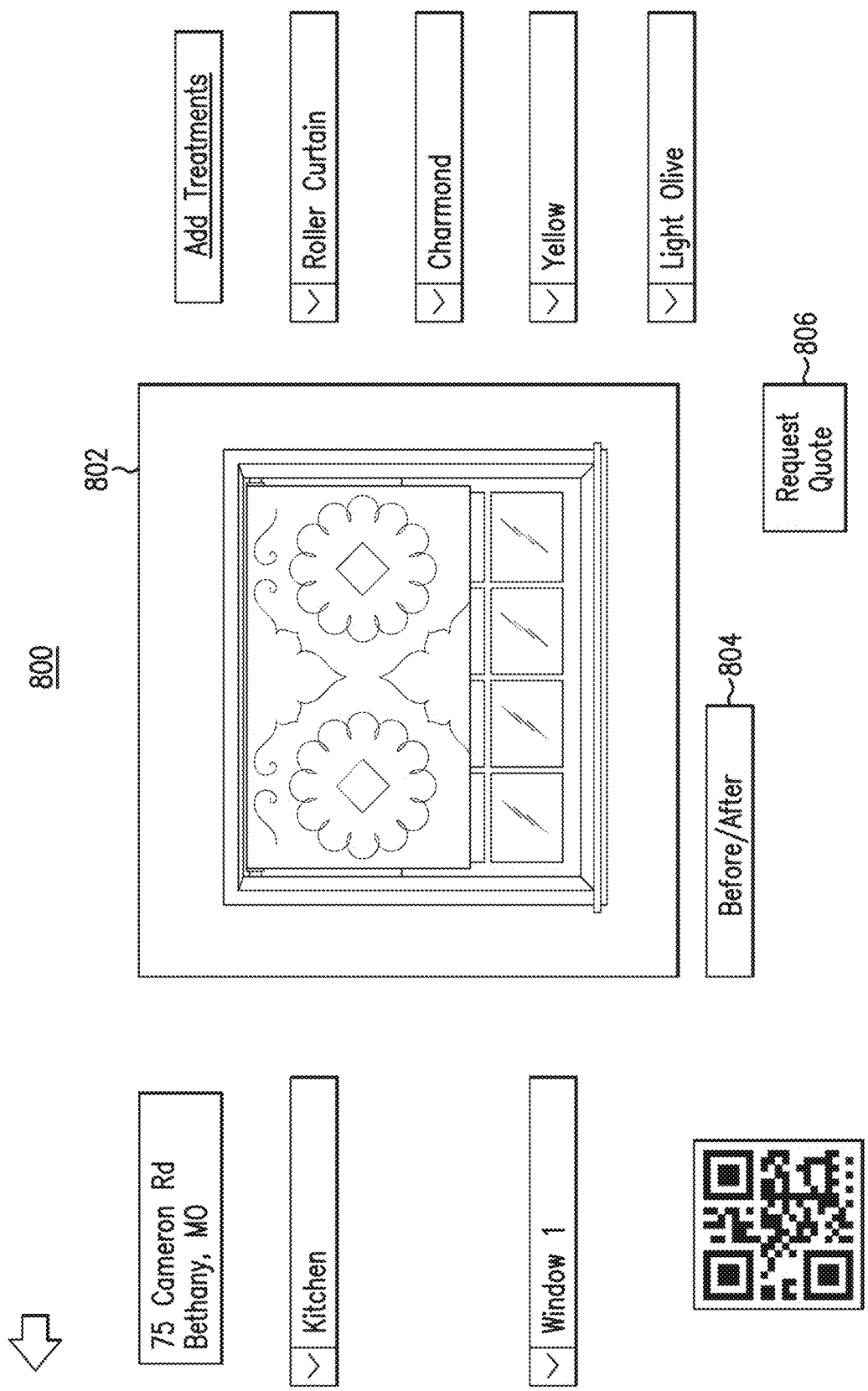
FIG. 8 is an exemplary user interface screen presented by the Merchant web site for virtual window treatment preview according to an embodiment of the present disclosure showing a rendered window including a window treatment.
Figure 9:
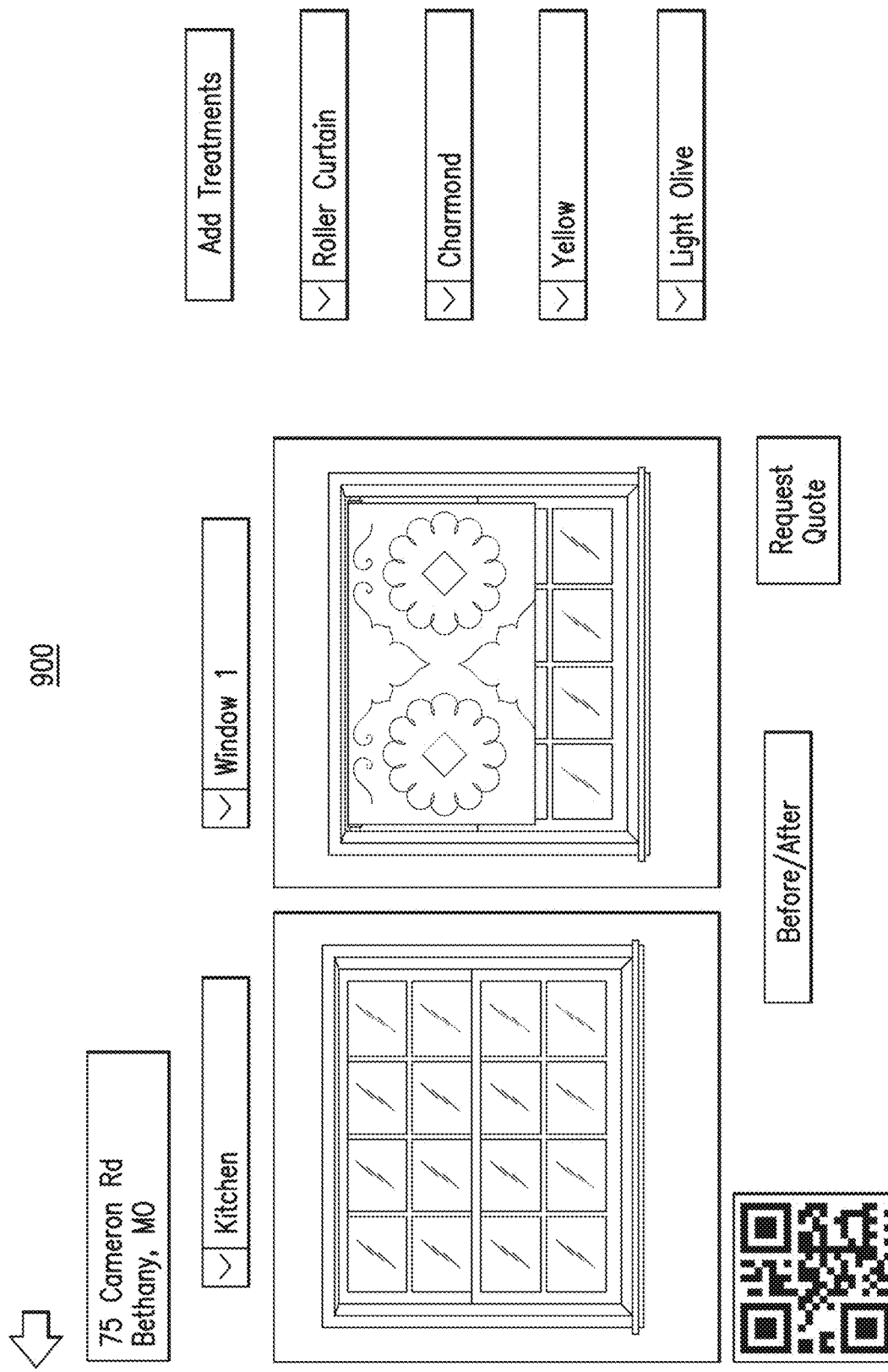
FIG. 9 is an exemplary user interface screen presented by the Merchant web site for virtual window treatment preview according to an embodiment of the present disclosure showing a juxtaposition of a window without window treatment and a window with a rendered window treatment.

FIG. 8 is an exemplary user interface screen 800 presented by the Merchant web site for virtual window treatment preview according to an embodiment of the present disclosure after an exemplary window treatment has been selected, added, and rendered. The representation 802 shown in FIG. 8 includes a rendering of a selected window treatment onto the window. The rendering module 510 modifies window treatment data to render window treatments adapted to an accurately rendered window, such as by using the window data such as professionally measured dimensions of the window and adapting the window treatment data to correlate to the precise dimensions of the window. As the renderings are substantially two-dimensional, the rendering module may use known algorithms for adjustment of scale in the (x, y) plane. Additional graphics effects may also be used to make the rendering more realistic, such as texture, lighting, and shading effects, or for making the renderings three-dimensional. Activation of a before/after button 804 causes a side-by-side juxtaposition of representations of the window prior to and after the window treatment has been added. FIG. 9 shows an example before/after view screen 900 with representation 902 without the window treatment on the left, and representation 904 with the window treatment on the right. The juxtaposition of the representations may provide a better comparison to the customer and highlight the decorative difference that the window treatment adds. Using user interface screen 800, the application is user-friendly and allows users to visualize virtual renderings of the graphical representation of the window with different window treatment options to allow a user to optimize his/her selection of window treatments. The capability of accurately virtually depicting the window with the proper proportions (both of the window itself as well as proportions relative to a selected exemplary window treatment) based on window data such as measurement data accessible from the database of the memory unit facilitates accurate visualization of the window with a selected window treatment. The application is configured to recall window data collected by the window professional (or even by the customer) and input and stored in the database for rendering one or more of the windows in a customer's home. Upon recalling such data from the database, the application comprises a recommendation engine configured to provide recommendations to customers for window treatments. The recommendations can be based on a combination of one or more of the following non-limiting examples: (i) the measurements uploaded of the actual window, (ii) other window treatments in house/room, (iii) type of room (e.g., parlor vs. kitchen), (iv) color of window frame, (v) color of wall (paint or wallpaper), (vi) size of the room, (vii) amount of natural light in the room, (viii) the room style/décor, and (ix) physical clearance for the window treatment (e.g., obstacles or obstructions which may interfere with proper installment or use of a given window treatment), etc.

The recommendation engine in the application is configured to recall window data input and stored in the database for rendering virtual visualizations of one more windows and checking, verifying, advising on, or suggesting optimal window treatments for a given window. The recommendation engine is configured to recall all window data relevant to a window or a set of windows, including, without limitation, the shape, size, and color scheme of the windows, type and size of the room, and the type of window treatments in other nearby rooms to provide recommendations for the optimal window treatments for each particular window. The recommendation engine may automatically generate recommendations, such as upon review of a selected window treatment for a given window (reviewing, checking, advising on, and/or providing suggestions with regard to a window treatment that has already been selected), or upon review of the window data and generating a suggested window treatment for that window. The recommendation engine may be automated, or may be used by the Merchant, such as by a trained designer, to facilitate the Merchant's advising on selection of a window treatment, options for window treatments, or proposed window treatments for a given window. It will be appreciated that use of a recommendation engine is facilitated by access to the database of window data maintained by the Merchant. It will be appreciated that the recommendation engine is optional, and the user may, of course, make his or her own selections of window treatments to virtually visualize without the use of the recommendation engine.

The recommendations can also be based on, for example, the launch of new products or existing products in new styles, information gathered on an address change of the customer, or a change in ownership based on property records, etc. For instance, the Merchant may send alerts or notices to the customer when new products, styles, or other window treatment features become available. The Merchant may be able to send information to the customer based on the customer information stored in the database with the window data. Suggested modifications, changes, updates, etc., may be sent to the customer, along with virtual visualizations or links to the database so that the customer may virtually visualize the Merchant's proposal on the user interface.

Where color of paint or wallpaper is used as one of the qualifications in the recommendation engine, the application is configured to use uploaded photographs to back out the CIE LAB color coordinates from the picture, including luminosity ($L^*$), and red/green coordinate ($a^*$) and blue/ yellow coordinate (b*). Color differences are commonly classified according to the L*a*b* color space of the Commission Internationale l'Eclairage (CIE). The three components of this system consist of L*, which describes luminosity on a scale of 0-100 (i.e., 0 is black and 100 is white), a*, which describes the red-green axis (i.e., positive values are red and negative values are green), and b*, which describes the yellow-blue axis (i.e., positive values are yellow and negative values are blue).

In a preferred embodiment, the window data is stored in the database of the memory unit and recalled by the processor of the application upon inputting the identification of a specific window of a customer's home, for selecting window treatments to be visualized by the customer on the user interface. As such, the processor automatically recalls the window data for the customer from the database of the memory unit so that the customer conveniently has accurate information on his/her windows readily available without requiring further input from the customer or any further data collection after the preliminary data collection (such as by a professional) has been taken. The use of actual measurements in the rendering provides for a more accurate rendering and optimal recommendations, resulting in a technically superior technique for visualization of window treatments. It will be appreciated that use of measurement data corresponding to the window as well as accurate visualization of the window treatment (with its corresponding accurate measurements, dimensions, proportions, etc.), and using the same scale for both virtual visualizations (so that the window measurements and the window treatment measurements are visualized in the same scale) allow not only for proper visualization of the window, but also for proper visualization of the window treatment relative to the window and preferably accurate measurement for the visualized window treatment.

Moreover, the window data is preferably maintained in a secure format and need not be visible to the consumer or require active access by the consumer (i.e., the window data is automatically accessed without requiring any steps to be performed by the customer) as this simplifies the user interface for creating renderings or ordering window treatments. As such, window data is maintained by the Merchant to allow for substantially seamless virtual visualization of the customer's windows and exemplary window treatments mounted thereon. Moreover, maintenance of such window data allows the Merchant to work with a customer's order substantially seamlessly (such as to process, revise, check choices made in, etc., the customer's order), as the window data is readily accessible to the Merchant via field information/communication module 502. Even if a window treatment for only one window in the premises is to be selected, the database can retain window data for all other windows in the premises for later access as desired. As such, window data collection need only be done once, and the customer and Merchant can readily access such information at any later time, such as by inputting customer information (e.g., name, phone number, user name, etc.) or premises information (e.g., address, phone number). In some embodiments, the window data can be provided, for example, on a complementary basis, on a subscription basis, for a one time fee, and the like. The collection of customer information and window data is designed to facilitate customer use of the user interface and selection of preferable window treatments from the window treatment database. The collection of customer information and window data, stored in the database of the memory unit, is designed to be easily accessible to the Merchant for recall at any later time for ease of rendering new window treatment options on the web interface module. The application is configured to recall any necessary customer information or window data from the database upon prompting, either by the entry of a customer name into the customer data module 506 or when a window identifier is scanned by the processor into the field information/communication module.

If the customer approves of the window treatment, the customer may activate a request quote button 806 which may generate an automatic quote using known pricing data for the particular window treatment or may generate a prompt for Merchant sales personnel to contact the customer directly, for example, by opening a chat window in the web session, sending an email, initiating a phone conversation, etc. Referring again to FIG. 12, in some implementations, the customer may select to initiate a payment process by way of the user interface, such as by interacting with an object including an offer for a sale of goods or services. Upon obtaining the user payment input 1218, the user device may generate a card authorization request, e.g., 1220. For example, the user device may provide a card authorization request, e.g., 1221, on behalf of the user, a HTTP(S) GET message including the product order details for a pay network server in the form of XML-formatted data. Below is an example HTTP(S) GET message including an XML-formatted card authorization request for the pay network server:

```
GET /purchase.php HTTP/1.1
Host: www.merchant.com
Content-Type: Application/XML
Content-Length: 1306
<?XML version = "1.0" encoding = "UTF-8"?>
<purchase_order>
   <order_ID>4NFU4RG94</order_ID>
   <alerts_URL>www.merchant.com/shopcarts.php?sessionID=AEBB4356
</alerts_URL>
   <timestamp>2011-02-22 15:22:43</timestamp>
   <user_ID>john.q.public@gmail.com</user_ID>
   <client_details>
      <client_IP>192.168.23.126</client_IP>
      <client_type>smartphone</client_type>
      <client_model>HTC Hero</client_model>
      <OS>Android 2.2</OS>
      <app_installed_flag>true</app_installed_flag>
   </client_details>
   <purchase_details>
      <num_products>1</num_products>
      <product>
         <product_type>window_treatment</product_type>
         <product_params>
            <product_title>Silhouette[R]</product_title>
            <SKU>123456</ISBN>
            <seller>Hunter_Douglas</seller>
         </product_params>
         <quantity>1</quantity>
      </product>
   </purchase_details>
   <merchant_params>
      <merchant_id>3FBCR4INC</merchant_id>
      <merchant_name> Hunter_Douglas </merchant_name>
      <merchant_auth_key>1NNF484MCP59CHB27365</
      merchant_auth_key>
   </merchant_params>
   <account_params>
      <account_name>John Q. Public</account_name>
      <account_type>credit</account_type>
      <account_num>123456789012345</account_num>
      <billing_address>123 Green St., Norman, OK 98765</
      billing_address>
      <phone>123-456-7809</phone>
      <sign>/jqp/</sign>
      <confirm_type>email</confirm_type>
      <contact_info>john.q.public@gmail.com</contact_info>
```

```
    </account_params>
    <shipping_info>
       <shipping_adress>same as billing</shipping_address>
       <ship_type>expedited</ship_type>
       <ship_carrier>FedEx</ship_carrier>
       <ship_account>123-45-678</ship_account>
       <tracking_flag>true</tracking_flag>
       <sign_flag>false</sign_flag>
    </shipping_info>
</purchase_order>
```

In some implementations, the card authorization request generated by the client device 1202 may include a minimum of information required to process the purchase transaction. For example, this may improve the efficiency of communicating the purchase transaction request, and may also advantageously improve the privacy protections provided to the customer and/or Merchant. For example, in some implementations, the card authorization request may include at least a merchant ID, a session ID for the customer's shopping session with the merchant, and a device ID of the client device 1202. In some implementations, the customer may select to conduct the transaction using a one-time anonymized credit card number. For example, the web interface module 508 may utilize a pre-designated anonymized set of card details. As another example, the web interface module 508 may generate, e.g., in real-time, a one-time anonymous set of card details to securely complete the purchase transaction. In such implementations, the web interface module 508 may automatically set the customer profile settings such that the any personal identifying information of the user will not be provided to other entities. In some implementations, the customer may be required to enter a user name and password to enable the anonymization features.

Figure 13:
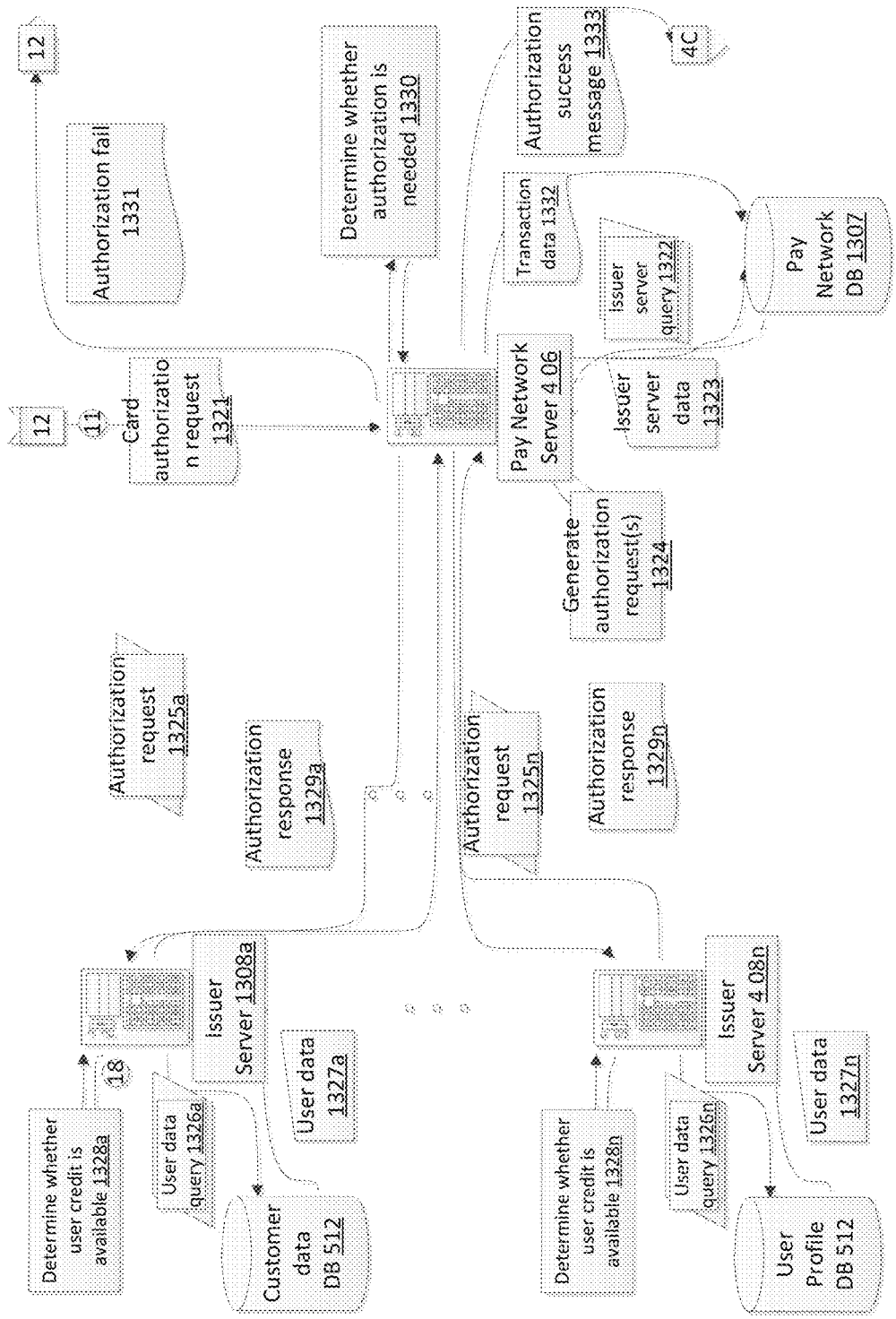
FIGS. 13-15 depict exemplary data flow diagrams of an electronic payment system in accordance with the disclosure.

With reference to FIG. 13, in some implementations, the pay network server 1306 may process the transaction so as to transfer funds for the purchase into an account stored on an acquirer of the merchant. For example, the acquirer may be a financial institution maintaining an account of the merchant. For example, the proceeds of transactions processed by the Merchant may be deposited into an account maintained by at a server of the acquirer. In some implementations, the pay network server 1306 may generate a query, e.g., 1322, for issuer server(s) corresponding to the user-selected payment options. For example, the customer's account may be linked to one or more issuer financial institutions ("issuers"), such as banking institutions, which issued the account(s) for the customer. For example, such accounts may include, but not be limited to: credit card, debit card, prepaid card, checking, savings, money market, certificates of deposit, stored (cash) value accounts, and/or the like. Issuer server(s), e.g., 1308a-n, of the issuer(s) may maintain details of the user's account. In some implementations, a database, e.g., pay network database 1307, may store details of the issuer server(s) associated with the issuer(s). For example, the database may be a relational database responsive to Structured Query Language ("SQL") commands. The pay network server may query the pay network database for issuer server(s) details. For example, the pay network server may execute a hypertext preprocessor ("PHP") script including SQL commands to query the database for details of the issuer server(s). An example PHP/SQL command listing, illustrating substantive aspects of querying the database, is provided below:

```
<?PHP
header('Content-Type: text/plain');
mysql_connect("254.93.179.112",$DBserver,$password); //
 access database server
mysql_select_db("ISSUERS.SQL"); // select database table
 to search
//create query for issuer server data
$query = "SELECT issuer_name issuer_address
 issuer_id ip_address mac_address auth_key
 port_num security_settings_list FROM IssuerTable
 WHERE account_num LIKE '%'
 $accountnum";
$result = mysql_query($query); // perform the search query
mysql_close("ISSUERS.SQL"); // close database access
?>
```

In response to obtaining the issuer server query, e.g., 1322, the pay network database may provide 423 the requested issuer server data to the pay network server. In some implementations, the pay network server 1306 may utilize the issuer server data to generate authorization request(s), e.g., 1324, for each of the issuer server(s) 1308a-n selected based on the pre-defined customer payment settings, and/or the customer's payment options input, and provide the card authorization request(s), e.g., 1325a-n, to the issuer server(s). In some implementations, the authorization request(s) may include details such as, but not limited to: the costs involved in the transaction, card account details of the user, user billing, and/or shipping information, and/or the like. For example, the pay network server 1306 may provide a HTTP(S) POST message including an XML-formatted authorization request similar to the example listing provided below:

```
POST /authorization.php HTTP/1.1
Host: www.issuer.com
Content-Type: Application/XML
Content-Length: 624
<?XML version = "1.0" encoding = "UTF-8"?>
<card_query_request>
    <query_ID>VNEI39FK</query_ID>
    <timestamp>2011-02-22 15:22:44</timestamp>
    <purchase_summary>
       <num_products>1</num_products>
       <product>
          <product_summary>Silhouette[R] Covering Custom Width
</product_summary>
          <product_quantity>1</product_quantity?
       </product>
    </purchase_summary>
    <transaction_cost>$559.99</transaction_cost>
    <account_params>
       <account_type>checking</account_type>
       <account_num>1234567890123456</account_num>
    </account_params>
    <merchant_params>
       <merchant_id>3FBCR4INC</merchant_id>
       <merchant_name>Hunter Douglas, Inc.</merchant_name>
       <merchant_auth_key>1NNF484MCP59CHB27365</merchant_
         auth_key>
    </merchant_params>
</card_query_request>
```

In some implementations, an issuer server may parse the authorization request(s), and based on the request details may query a database, e.g., customer profile database 1309, for data associated with an account linked to the user. For example, the issuer server may issue PHP/SQL commands similar to the example provided below:

```
<?PHP
header('Content-Type: text/plain');
mysql_connect("254.93.179.112",$DBserver,$password); // access database
server
mysql_select_db("USERS.SQL"); // select database table to search
//create query for user data
$query = "SELECT user_id user_name user_balance account_type FROM
UserTable
WHERE account_num LIKE '%' $accountnum";
$result = mysql_query($query); // perform the search query
mysql_close("USERS.SQL"); // close database access
?>
```

In some implementations, on obtaining the customer profile data 1327, the issuer server may determine whether the user can pay for the transaction using funds available in the account, e.g., 1328. For example, the issuer server may determine whether the user has a sufficient balance remaining in the account, sufficient credit associated with the account, and/or the like. Based on the determination, the issuer server(s) may provide an authorization response, e.g., 1329, to the pay network server 1306. For example, the issuer server(s) 1308a-n may provide a HTTP(S) POST message similar to the examples above. In some implementations, if at least one issuer server determines that the user cannot pay for the transaction using the funds available in the account, see e.g., 1330-31, the pay network server 1306 may request payment options again from the user (e.g., by providing an authorization fail message 1331 to the client device and requesting the user device to provide new payment options), and re-attempt authorization for the purchase transaction. In some implementations, if the number of failed authorization attempts exceeds a threshold, the pay network server may abort the authorization process, and provide an "authorization fail" message to the Merchant web server 125 and client device 1202.

In some implementations, the pay network server 1306 may obtain the authorization message including a notification of successful authorization 1333, and parse the message to extract authorization details. Upon determining that the customer possesses sufficient funds for the transaction, the pay network server 1306 may generate a transaction data record, e.g., 1332, from the authorization request and/or authorization response, and store the details of the transaction and authorization relating to the transaction in a transactions database. For example, the pay network server may issue PHP/SQL commands similar to the example listing below to store the transaction data in a database:

possesses sufficient funds in the card account to conduct the transaction. The Merchant server 125 may add a record of the transaction for the user to a batch of transaction data relating to authorized transactions. For example, the Merchant may append the XML data pertaining to the transaction to an XML data file comprising XML data for transactions that have been authorized for various customers 1434, and store the XML data file, customer database 512. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Hunter Douglas, Inc.</merchant_name>
    <merchant_auth_key>1NNF484MCP59CHB27365</merchant_
    auth_key>
    <account_number>123456789</account_number>
</merchant_data>
<transaction_data>
    <transaction 1>
        ...
    </transaction 1>
    <transaction 2>
        ...
    </transaction 2>
    .
    .
    .
    <transaction n>
        ...
    </transaction n>
</transaction_data>
```

In some implementations, the server may also generate a purchase receipt, e.g., 1434, and provide the purchase receipt to the client, e.g., 1436. The client device 1202 may render and display the purchase receipt for the user 1437a. In some implementations, the client device 1202 may also provide a notification of successful authorization to the user, e.g., 1437b. For example, the client device 1202 may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 15:
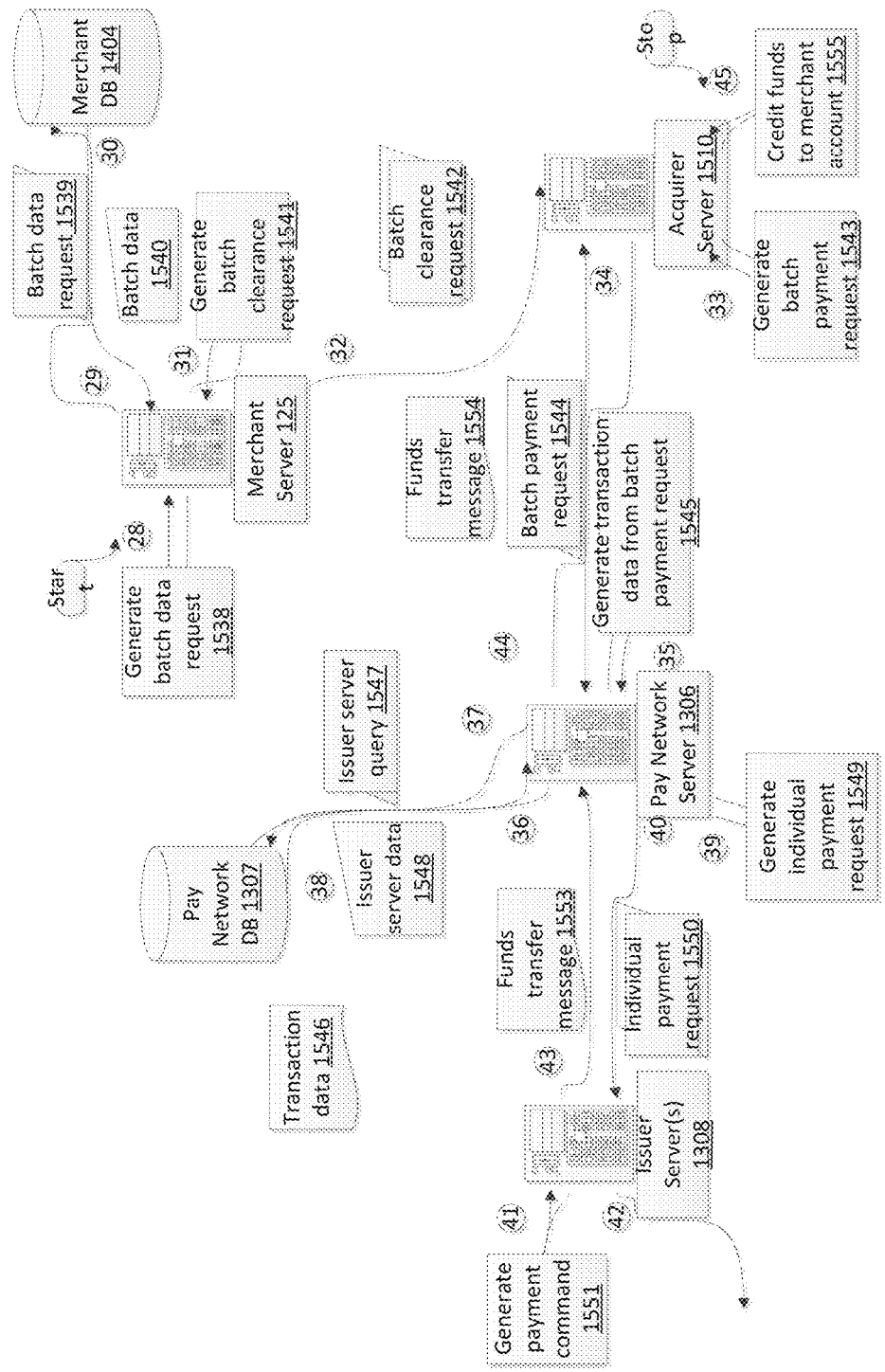

With reference to FIG. 15, in some implementations, the Merchant web server 125 may initiate clearance of a batch of authorized transactions. For example, the web server 125

```
<?PHP
header('Content-Type: text/plain');
mysql_connect("254.92.185.103",$DBserver,$password); // access database server
mysql_select("TRANSACTIONS.SQL"); // select database to append
mysql_query("INSERT INTO PurchasesTable (timestamp, purchase_summary_list,
num_products, product_summary, product_quantity, transaction_cost, account_params_list,
account_name, account_type, account_num, billing_addres, zipcode, phone, sign,
merchant_params_list, merchant_id, merchant_name, merchant_auth_key)
VALUES (time( ), $purchase_summary_list, $num_products, $product_ summary,
$product_quantity, $transaction_cost, $account_params_list, $account_name, $account_type,
$account_num, $billing_addres, $zipcode, $phone, $sign, $merchant_params_list,
$merchant_id, $merchant_name, $merchant_auth_key)"); // add data to table in database
mysql_close("TRANSACTIONS.SQL"); // close connection to database
?>
```

Figure 14:
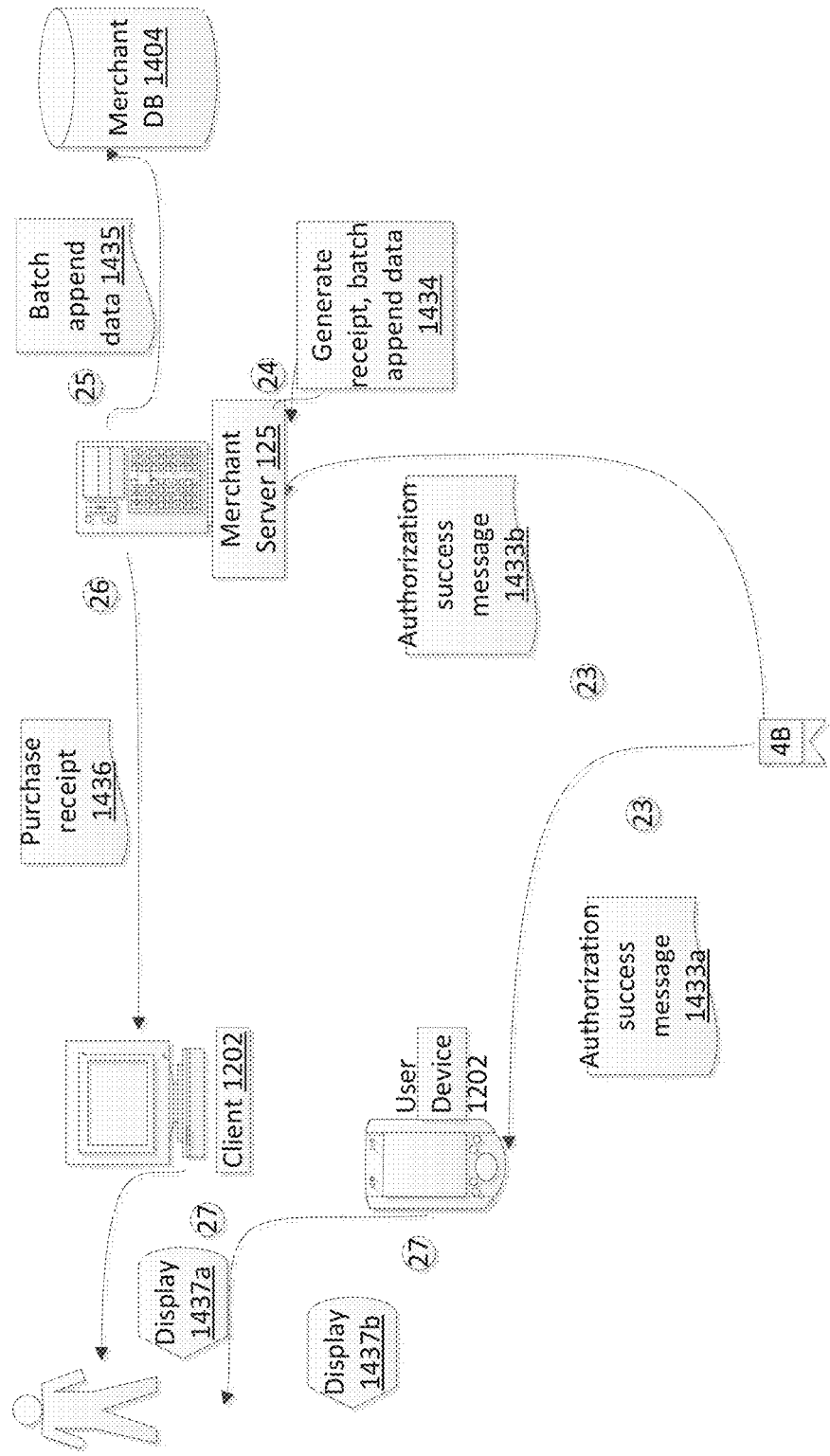

Referring to FIG. 14, in some implementations, the pay network server 1306 may forward an authorization success message, e.g., 1433a-b, to the client device 1202, and/or Merchant server 125. The Merchant may obtain the authorization message, and determine from it that the customer may generate a batch data request, e.g., 1538, and provide the request 1539, to a database, e.g., customer database 512. For example, the web server 125 may utilize PHP/SQL commands similar to the examples provided above to query a relational database. In response to the batch data request, the database may provide the requested batch data 1540. The server 125 may generate a batch clearance request, 1541 using the batch data obtained from the database, and provide the batch clearance request 1542 to an acquirer server 1510. For example, the merchant server 125 may provide a HTTP (S) POST message including XML-formatted batch data in the message body for the acquirer server 1510. The acquirer server 1510 may generate a batch payment request 1543 using the obtained batch clearance request, and provide the batch payment request 1544 to the pay network server 1306. The pay network server 1306 may parse the batch payment request, and extract the transaction data for each transaction stored in the batch payment request 1545. The pay network server 1306 may store the transaction 1546, for each transaction in a database 1307. For each extracted transaction, the pay network server 1306 may query 1547 pay network database 407, for an address of an issuer server, and receive data back therefrom in response 1548. For example, the pay network server 1306 may utilize PHP/SQL commands similar to the examples provided above. The pay network server 1306 may generate an individual payment request 1549, for each transaction for which it has extracted transaction data, and provide the individual payment request 1550, to the issuer server 1308. For example, the pay network server may provide a HTTP(S) POST request similar to the example below:

```
POST /requestpay.php HTTP/1.1
Host: www.issuer.com
Content-Type: Application/XML
Content-Length: 788
<?XML version = "1.0" encoding = "UTF-8"?>
<pay_request>
    <request_ID>CNI4ICNW2</request_ID>
    <timestamp>2011-02-22 17:00:01</timestamp>
    <pay_amount>$559.99</pay_amount>
    <account_params>
        <account_name>John Q. Public</account_name>
        <account_type>credit</account_type>
        <account_num>123456789012345</account_num>
        <billing_address>123 Green St., Norman, OK 98765</bill
        ing_address>
        <phone>123-456-7809</phone>
        <sign>/jqp/</sign>
    </account_params>
    <merchant_params>
        <merchant_id>3FBCR4INC</merchant_id>
        <merchant_name>Hunter Douglas, Inc.</merchant_name>
        <merchant_auth_key>1NNF484MCP59CHB27365</merchant_
        auth_key>
    </merchant_params>
    <purchase_summary>
        <num_products>1</num_products>
        <product>
<product_summary>Silhouette[R]_Covering_Custom_Width</product_
summary>
            <product_quantity>1</product_quantity?
        </product>
    </purchase_summary>
</pay_request>
```

In some implementations, the issuer server 1308 may generate a payment command 1551. For example, the issuer server 1308 may issue a command to deduct funds from the customer's account (or add a charge to the user's credit card account). The issuer server 1308 may issue a payment command 1552 to a database storing the user's account information customer profile database 1309. The issuer server may provide a funds transfer message 1553, to the pay network server, which may forward the funds transfer message 1554 to the acquirer server 1510. An example HTTP(S) POST funds transfer message is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$34.78</deposit_amount>
</deposit_ack>
```

In some implementations, the acquirer server 1510 may parse the funds transfer message, and correlate the transaction (e.g., using the request_ID field in the example above) to the Merchant. The acquirer server 1510 may then transfer the funds specified in the funds transfer message to an account of the Merchant 1555.

Figure 10:
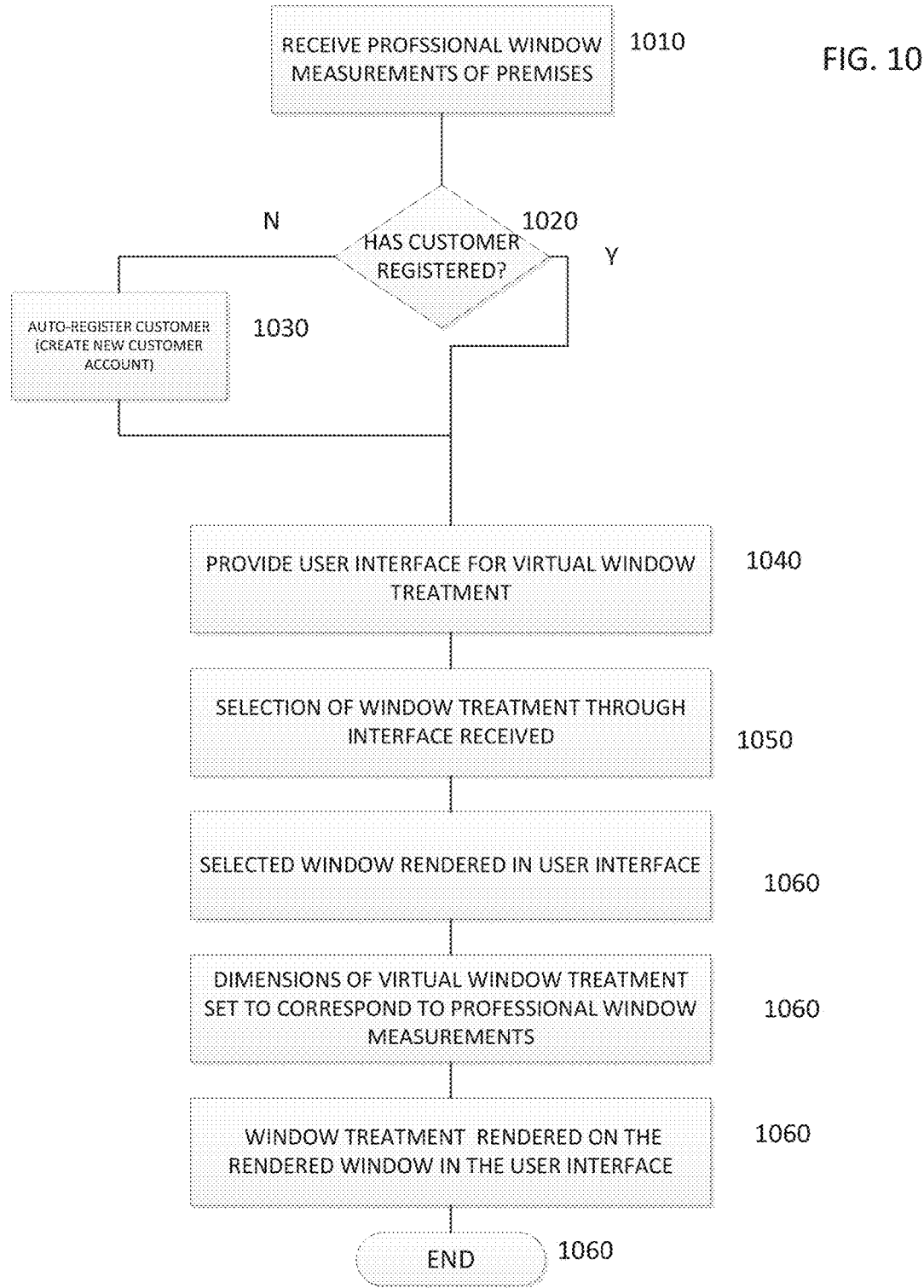
FIG. 10 is a flow chart of an exemplary method of providing a virtual decorating interface for windows according to an embodiment of the present disclosure.

FIG. 10 is a flow chart of an exemplary method of providing a virtual decorating interface for windows according to an embodiment of the present disclosure. In a first step 1010, window data pertaining to a given premises are received and stored. In step 1020, it is determined whether the window data are associated with a customer account. If not, in step 1030, the received window data are used to create a new customer account. If it is determined that a customer account already exists, or the customer account has been created in step 1030, in step 1040 a user interface for selection of a virtual window treatment for the at least one window is provided. In step 1050, in response to user selection of a particular window treatment or recommendation of a window treatment by the recommendation engine, the window is rendered in the user interface, in which the rendering corresponds to the window data relating to the window, such as professional measurements thereof, stored in the database and recalled by the rendering module. In step 1060, a selection of a window treatment to be applied to the rendered window is received, and in step 1070, dimensions of the selected window are set to correspond to the professional measurements of the window. In step 1080 the window treatments are rendered onto the window in the user interface which can be visualized by the user. The method ends in step 1090. Through use of the above-described systems and methods, a realistic virtual visualization of a window decoration may be provided. It will be appreciated that if the window data includes photographs of the window, then a virtual visualization of a selected window treatment is readily visualized on a photograph of the window to provide for a high degree of accuracy in the virtual visualization.

Figure 11:
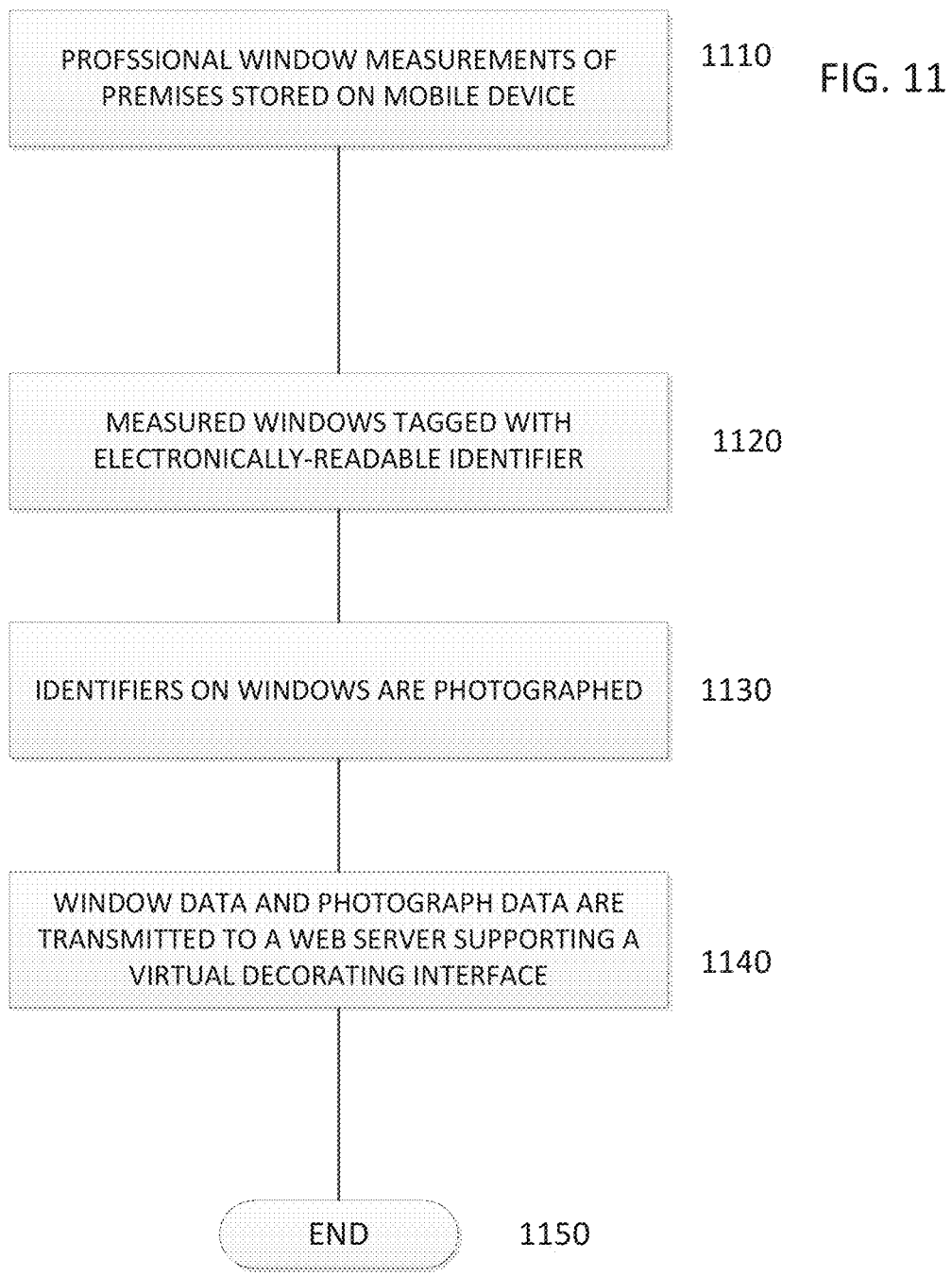
FIG. 11 is a flow chart of an exemplary method of enabling a virtual window decorating interface with professional window measurements using a mobile electronic device according to an embodiment of the present disclosure.
Figure 12:
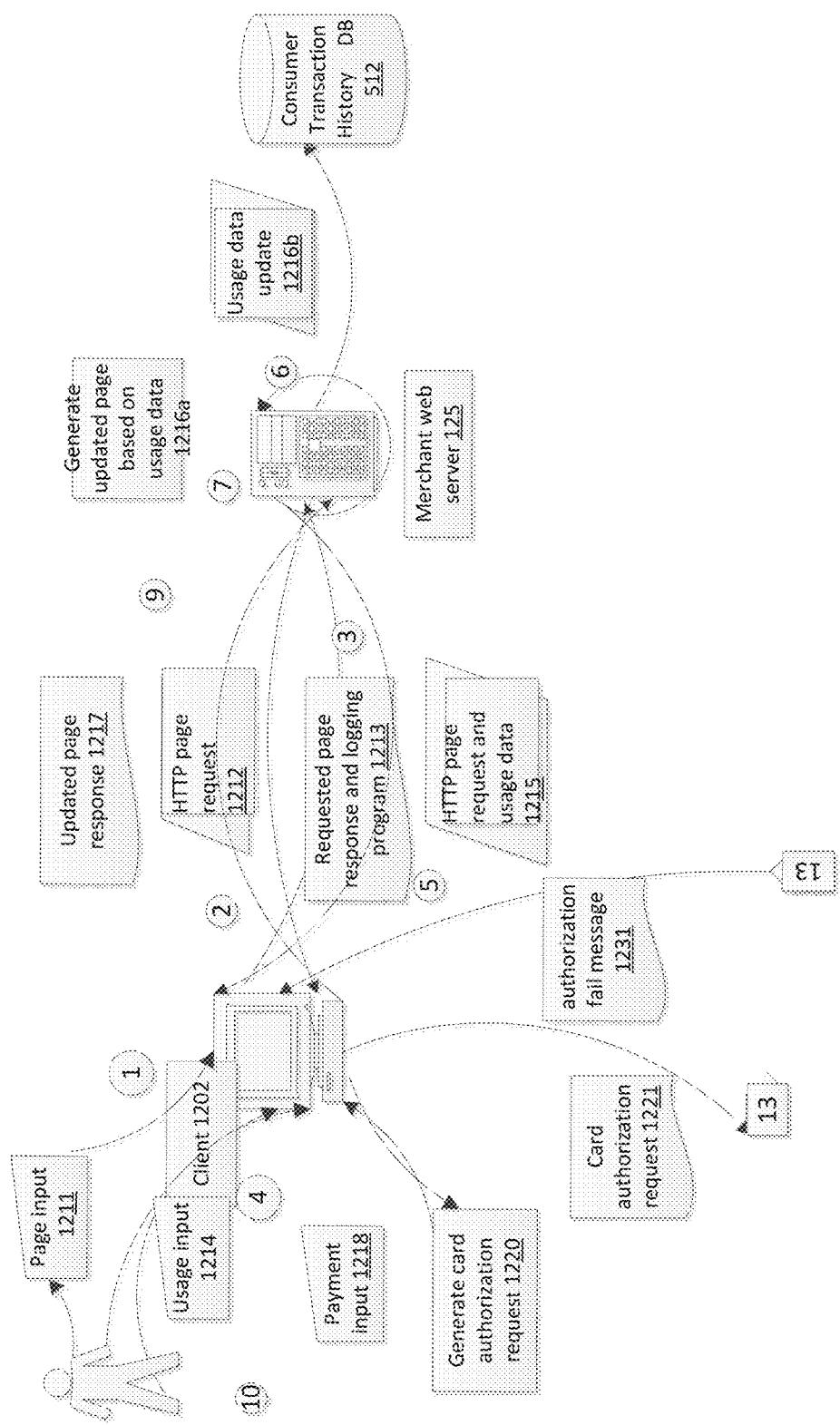
FIG. 12 is a data flow diagram illustrating exemplary data flows of the system.

FIG. 11 is a flow chart of an exemplary method of enabling a virtual window decorating interface according to an embodiment of the present disclosure. In a first step 1110, window data pertaining to windows at a customer premises are stored in the database, such as by using a mobile electronic device. In a following step 1120, the windows from which window data have been gathered are tagged or marked with an electronically-readable identifier, and in step 1130 the identifiers are photographed using the mobile electronic device. In step 1140, the window data and optional identifier photographs are transmitted (in some embodiments, via one or more intermediaries) to a server supporting a web site interface which enables the customer to preview window treatments rendered in accordance with the window data collected on the window, such as in accordance with dimensions obtained from the professional measurements of the at least one window of the premises.

The method ends in step 1150. The list of steps described above are exemplary, and may include other steps not included therein, or may comprise than all steps listed therein.

Figure 16:
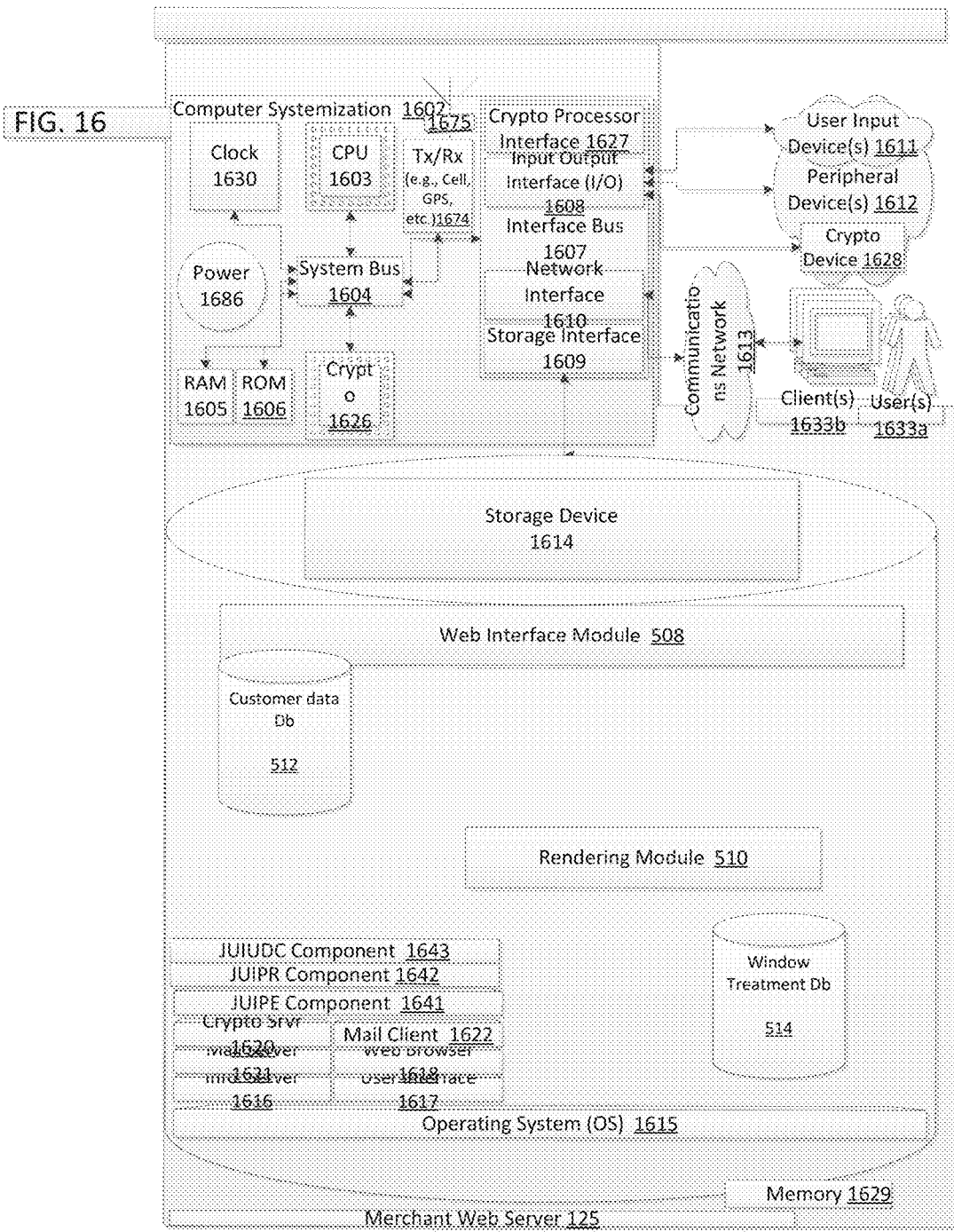
FIG. 16 is an illustrative system diagram in accordance with the disclosure.

FIG. 16 is a block diagram of a Merchant web server 125 according to an embodiment of the present disclosure. In this embodiment, the web server 125 may serve to aggregate, process, store, search, serve, identify, instruct, generate, match, and/or facilitate interactions with a computer through various technologies, and/or other related data. In some embodiments, the web server 125 may be connected to and/or communicate with entities such as, but not limited to: one or more users from user input devices 1611, peripheral devices 1612, an optional cryptographic processor device 1628, and/or a communications network 1613. For example, the web server 125 may be connected to and/or communicate with users (e.g., customers), 633a, operating client device(s) 633b, including, but not limited to, personal computer(s), server(s), and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

It should be noted that the term "server" as used herein refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests, and obtaining and processing any responses from servers across a communications network. A computer, other device, program, or combination thereof that facilitates, processes information and requests, and/or furthers the passage of information from a source user to a destination user is commonly referred to as a "node." Networks facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is an interconnection of a multitude of networks whereby remote clients and servers may access and interoperate with one another.

The web server 125 may be based on computer systems that may comprise, but are not limited to, components such as: a computer systemization 1602 connected to memory 1629. A computer systemization 1602 may comprise a clock 1630, central processing unit ("CPU(s)," and/or "processor(s)" (these terms are used interchangeable throughout the disclosure unless noted to the contrary)) 1603, a memory 1629 (e.g., a read only memory (ROM) 606, a random access memory (RAM) 605, etc.), and/or an interface bus 1607, and most frequently, although not necessarily, are all interconnected and/or communicating through a system bus 1604 on one or more (mother)board(s) 1602 having conductive and/or otherwise transportive circuit pathways through which instructions (e.g., binary encoded signals) may travel to effect communications, operations, storage, etc. Optionally, the computer systemization may be connected to an internal power source 1686; e.g., optionally the power source may be internal. Optionally, a cryptographic processor 1626 and/or transceivers (e.g., ICs) 1674 may be connected to the system bus. In another embodiment, the cryptographic processor and/or transceivers may be connected as either internal and/or external peripheral devices 1612 via the interface bus I/O. In turn, the transceivers may be connected to antenna(s) 1675, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing web server 125 to determine its location)), Broadcom BCM4329FKUBG transceiver chip (e.g., providing 802.11n, Bluetooth 2.1+ EDR, FM, etc.), a Broadcom BCM4750IUB8 receiver chip (e.g., GPS), an Infineon Technologies X-Gold 618-PMB9800 (e.g., providing 2G/3G HSDPA/HSUPA communications), and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU 1603 may comprise at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU 1603 may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU 1603 interacts with memory through instruction passing through conductive and/or transportive conduits (e.g., (printed) electronic and/or optic circuits) to execute stored instructions (i.e., program code) according to conventional data processing techniques. Such instruction passing facilitates internal communication and external communication through various interfaces.

Should processing requirements dictate a greater amount speed and/or capacity, distributed processors, mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the web server 125 may be achieved by implementing a microcontroller such as CAST's R8051XC2 microcontroller, Intel's MCS 51 (i.e., 8051 microcontroller), and/or the like. Also, to implement certain features of the web server 125, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the web server 125 component collection (distributed or otherwise) and/or features may be implemented via the microprocessor and/or via embedded components, e.g., via ASIC, coprocessor, DSP, FPGA, and/or the like. Alternately, some implementations of the web server may be implemented with embedded components that are configured and used to achieve a variety of features or signal processing.

Depending on the particular implementation, the embedded components may include software solutions, hardware solutions, and/or some combination of both hardware/software solutions. For example, features provided by web server discussed herein may be achieved through implementing FPGAs, which are a semiconductor devices containing programmable logic components called "logic blocks", and programmable interconnects, such as the high performance FPGA Virtex series, and/or the low cost Spartan series manufactured by Xilinx Logic blocks and interconnects can be programmed by the customer or designer, after the FPGA is manufactured, to implement any of the features. A hierarchy of programmable interconnects allow logic blocks to be interconnected as needed by the system designer/administrator, somewhat like a one-chip programmable breadboard. An FPGA's logic blocks can be programmed to perform the function of basic logic gates such as AND and XOR, or more complex combinational functions such as decoders or simple mathematical functions. In most FPGAs, the logic blocks also include memory elements, which may be simple flip-flops or more complete blocks of memory. In some circumstances, the web server 125 may be developed on regular FPGAs and then migrated into a fixed version that more resembles ASIC implementations. Alternate or coordinating implementations may migrate controller features to a final ASIC instead of or in addition to FPGAs. Depending on the implementation all of the aforementioned embedded components and microprocessors may be considered the "CPU," and/or "processor" for the web server 125.

Generally, any mechanization and/or embodiment allowing a processor to affect the storage and/or retrieval of information is regarded as memory 1629. However, memory is a fungible technology and resource, thus, any number of memory embodiments may be employed in lieu of or in concert with one another. It is to be understood that the web server 125 and/or a computer systemization may employ various forms of memory 1629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1629 will include ROM 1606, RAM 1605, and a storage device 1614. A storage device 1614 may be any conventional computer system storage. Storage devices may include a drum, a (fixed and/or removable) magnetic disk drive; a magneto-optical drive, an optical drive (i.e., Blue ray, CD ROM/RAM/Recordable (R)/ReWritable (RW), DVD R/RW, HD DVD R/RW etc.), an array of devices (e.g., Redundant Array of Independent Disks (RAID)), solid state memory devices (USB memory, solid state drives (SSD), etc.), other processor-readable storage mediums, and/or other devices of the like. Thus, a computer systemization generally requires and makes use of memory.

The memory 1629 may contain a collection of program and/or database components and/or data such as, but not limited to: operating system component(s) 1615 (operating system), information server component(s) 1616 (information server), user interface component(s) 1617 (user interface), Web browser component(s) 1618 (Web browser), database(s) 512, 514, mail server component(s) 1621, mail client component(s) 1622, cryptographic server component(s) 1620 (cryptographic server), and a virtual decoration rendering component(s) 1635. These components may be stored and accessed from the storage devices and/or from storage devices accessible through an interface bus. Although non-conventional program components such as those in the component collection, typically, are stored in a local storage device 1614, they may also be loaded and/or stored in memory such as: peripheral devices, RAM, remote storage facilities through a communications network, ROM, various forms of memory, and/or the like.

The operating system component 1615 is an executable program component facilitating the operation of the web server 125. Typically, the operating system facilitates access of I/O, network interfaces, peripheral devices, storage devices, and/or the like. The operating system may be a highly fault tolerant, scalable, and secure system such as: Apple Macintosh OS X (Server), AT&T Plan 9, Be OS; Unix and Unix-like system distributions (such as AT&T's UNIX, Berkley Software Distribution (BSD) variations such as FreeBSD, NetBSD, OpenBSD, and/or the like, Linux distributions such as Red Hat, Ubuntu, and/or the like), and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the JUMPING UI controller to communicate with other entities through a communications network 613. Various communication protocols may be used by the web server as a subcarrier transport mechanism for interaction, such as, but not limited to: multicast, TCP/IP, UDP, unicast, and/or the like.

An information server component 1616 is a stored program component that may be executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the web server 125 based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with databases, operating systems, other program components, user interfaces, Web browsers, and/or the like.

Access to the customer data database 512 and window treatment database 514 may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the virtual decoration interface according to the present disclosure. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the virtual decoration interfac as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc., interface libraries such as, but not limited to, Dojo, jQuery(UI), MooTools, Prototype, script.aculo.us, SWFObject, Yahoo! User Interface, any of which may be used), and provide a baseline and means of accessing and displaying information graphically to users.

A web interface module (user interface) or component 508 is a stored program component that is executed by a CPU. The interface module 508 may provide a conventional graphic user interface as provided by, with, and/or atop operating systems and/or operating environments such as already discussed. The interface may allow for the display, execution, interaction, manipulation, and/or operation of program components and/or system facilities through textual and/or graphical facilities, and in particular, the virtual decorating exemplary interface of the present disclosure. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

A web browser component 1618 is a stored program component that is executed by a CPU 1603. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like. The combined application may be nugatory on systems employing standard Web browsers.

A mail server component 1621 is a stored program component that is executed by a CPU 1603. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the virtual decorating interface.

Access to the mail server 1621 may be achieved through a number of APIs offered by the individual Web server components and/or the operating system. Also, a mail server may contain, communicate, generate, obtain, and/or provide program component, system, user, and/or data communications, requests, information, and/or responses.

A mail client component 1622 is a stored program component that is executed by a CPU 1603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

A cryptographic server component 1620 is another stored program component that is executed by a CPU 603, cryptographic processor 1626, cryptographic processor interface 1627, cryptographic processor device 1628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ETC.), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the JUMPING UI may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable secure transactions if so desired. The cryptographic component facilitates the secure accessing of resources and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The database components 512, 514 may be embodied in a database and its stored data. The database is a stored program component, which is executed by the CPU 1603; the stored program component portion configuring the CPU to process the stored data. The databases 512, 514 may be conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the customer data and window treatment databases 512, 514 may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the databases are implemented as a data-structure, the use of the databases may be integrated into other components. Also, the database may be implemented as a mix of data structures, objects, and relational structures. Databases 512, 514 may be consolidated and/or distributed in countless variations through standard data processing techniques. Portions of databases, e.g., tables, may be exported and/or imported and thus decentralized and/or integrated. In one embodiment, the databases 512, 514 may interact with other database systems. For example, employing a distributed database system, queries and data access by search web browser component 1618 may treat the combination of the databases and integrated data security layer database as a single database entity.

In one embodiment, user programs may contain various user interface primitives, which may serve to update the virtual decoration interface. Also, various accounts may require custom database tables depending upon the environments and the types of customers. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components. The customer and window treatment databases 512, 514 may communicate to and/or with other components in a component collection, including itself, and/or facilities of the like. The databases may contain, retain, and provide information regarding other nodes and data.

In order to address various issues and advance the art, the entirety of this application for APPARATUS AND METHOD FOR PROVIDING A VIRTUAL DECORATION INTERFACE (including the Cover Page, Title, Headings, Field, Background, Summary, Brief Description of the Drawings, Detailed Description, Claims, Abstract, Figures, Appendices and/or otherwise) shows by way of illustration various embodiments in which the disclosed embodiments may be practiced. The advantages and features of the application are of a representative sample of embodiments only, and are not exhaustive and/or exclusive. They are presented only to assist in understanding and teach the claimed principles. It should be understood that they are not representative of all disclosed embodiments. As such, certain aspects of the disclosure have not been discussed herein. That alternate embodiments may not have been presented for a specific portion of the disclosed embodiments or that further undescribed alternate embodiments may be available for a portion is not to be considered a disclaimer of those alternate embodiments. It will be appreciated that many of those undescribed embodiments incorporate the same principles of the disclosure and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the disclosure, and inapplicable to others. In addition, the disclosure includes other embodiments not presently claimed. Applicant reserves all rights in those presently disclosed embodiments including the right to claim such embodiments, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a virtual decoration interface individual and/or enterprise user, database configuration and/or relational model, data type, data transmission and/or network framework, syntax structure, and/or the like, various embodiments of the virtual decoration interface may be implemented that enable a great deal of flexibility and customization. For example, aspects may be adapted for restaurant dining, online shopping, brick-and-mortar shopping, secured information processing, and/or the like. While various embodiments and discussions of the virtual decoration interface have been directed to electronic purchase transactions, however, it is to be understood that the embodiments described herein may be readily configured and/or customized for a wide variety of other applications and/or implementations.

What is claimed is:

1. A system for providing a virtual window treatment decorating interface, the system comprising:

a merchant server in communication with a window database comprising window data descriptive of at least one window of a premises of a customer and a window treatment database comprising window treatment data for at least one window treatment; wherein the window database is a hierarchical data structure having multiple levels of linked data so that the window data has metadata pertaining to at least one level of the hierarchical data structure, wherein the hierarchical data structure includes at least one of the following: an address of the premises of the customer; a list of room identifiers linked to the address for identifying each room of the premises; a list of window identifiers uniquely identifying each window of a total number of windows associated with and linked to a particular room from the list of room identifiers linked to the address of the premises; and the window treatment data linked to a particular window identifier from the list of window identifiers linked to the address of the premises;

wherein the list of window identifiers includes selections corresponding to the room selected in a manner according to the hierarchical data structure created for the premises; and a client device in communication with the merchant server, the client device configured for using instructions from the merchant server to provide a graphical user interface to the customer, wherein the graphical user interface is configured for:
presenting at least one window for the window database to the customer;
receiving a window selection from the customer;
presenting a window treatment option to the customer for the window selection;
receiving a window treatment selection from the customer; and
communicating the window treatment selection to the merchant server;
wherein the merchant server is configured for:
receiving the window treatment selection;
generating a virtual representation using a same scale of the window data for the received window selection from the customer and the window treatment data for the received window treatment selection from the customer; and
communicating the virtual representation to the client device for display to the customer through the graphical user interface.

2. The system as in claim 1, wherein the virtual representation comprises a depiction of the window selection with the window treatment selection applied thereto.

3. The system as in claim 2, wherein the depiction comprises a photograph of the window selection.

4. The system as in claim 1, wherein the client device is further configured for receiving a selection by the customer of the window treatment from the virtual representation.

5. The system as in claim 1, wherein the merchant server is configured to preview the window treatment selection fitted to the window data for the window selection.

6. The system as in claim 5, wherein the virtual representation comprises a rendered depiction of the window selection with the window treatment selection.

7. The system as in claim 6, wherein the depiction is adjusted according to lighting and/or shading, each based on an amount of natural light at different times of a day coming through the window selected by the customer.

8. The system as in claim 1, wherein the merchant server is configured to enable the customer to order the window treatment from the merchant according to the window data.

9. The system as in claim 1, further comprising at least one window identifier, each window identifier for being disposed at a window of the premises and associated with window data for that window.

10. The system as in claim 9, wherein the window identifier comprises at least one of an electronically readable code; a QR code; a bar code; an RFID tag; a Near Field Communication ("NFC") tag; and an electronically readable identifier.

11. The system as in claim 1, wherein window data for the at least one window comprises at least one of: a measurement; molding information; a shape; a type; a style; a direction in which the at least one window opens; a manufacturer; a location of the at least one window in at least one of the wall, a room and the premises; a number of windows; associated hardware; mounting information; environment information; identity of an associated window identifier; and at least one photograph.

12. The system as in claim 11, wherein the measurement comprises a nearest obstruction left and/or right of the window selection.

13. The system as in claim 1, wherein the merchant server is further configured to:
determine whether a customer account associated with the premises exists; and,
create the customer account associated with the premises if it is determined that the customer account associated with the premises does not yet exist.

14. The system as in claim 1, wherein the merchant server is further configured to:
communicate with a mobile device configured for collecting the window data at the premises of the customer; and,
receive the window data from the mobile device.

15. The system as in claim 14, wherein the mobile device is configured for receiving the window data from an electronic measurement device configured to record measurement data at the premises of the customer and transmit the measurement data thereto.

16. The system as in claim 1, further comprising a recommendation engine for making a recommendation of a window treatment to the customer.

17. The system as in claim 1, wherein the recommendation is based upon a change in ownership of the premises.

18. The system as in claim 1, wherein the window data stored in the window database is maintained for presenting new window treatment options at a later time.

19. The system as in claim 1, wherein the window data further comprises information whether any children are living in or expected to enter the premises.

20. The system as in claim 1, wherein the window data has the metadata pertaining to all levels of the hierarchical data structure, wherein the hierarchical data structure includes: an address of the premises of the customer; a list of room identifiers linked to the address for identifying each room of the premises; a list of window identifiers uniquely identifying each window of a total number of windows associated with and linked to a particular room from the list of room identifiers linked to the address of the premises; and the window treatment data linked to a particular window identifier from the list of window identifiers linked to the address of the premises.

21. A system for recommendation a window treatment, the system comprising:
a server in communication with a window database comprising window data descriptive of at least one window of a premises and a window treatment database comprising window treatment data for at least one window treatment; wherein the window database is a hierarchical data structure having multiple levels of linked data so that the window data has metadata pertaining to at least one level of the hierarchical data structure, wherein the hierarchical data structure includes at least one of the following: an address of the premises of the customer; a list of room identifiers linked to the address for identifying each room of the premises; a list of window identifiers uniquely identifying each window of a total number of windows associated with and linked to a particular room from the list of room identifiers linked to the address of the premises; and the window treatment data linked to a particular window identifier from the list of window identifiers linked to the address of the premises;
wherein the list of window identifiers includes selections corresponding to the room selected in a manner according to the hierarchical data structure created for the premises; and
a client device in communication with the server to provide a graphical user interface, wherein the graphical user interface is configured for:
presenting at least one window from the window database to a user;

receiving a window selection from the user;
presenting at least one window treatment option for the window selection to the user; and
wherein the server is configured for making a recommendation of a window treatment for the window selection from the window treatment database to the graphical user interface;
generating a virtual representation using a same scale of the window data for the received window selection from the user and the window treatment data based on the recommendation of the server.

22. The system as in claim 21, wherein the recommendation is based upon at least one of: a measurement; shape; type; style; direction in which the window opens, if at all; manufacturer; location; orientation; number of windows in a room; associated hardware; desired type of mount; surrounding molding information; window environment; decorative style; color; scheme; and at least one photograph.

23. The system as in claim 21, wherein the server is configured to automatically generate the recommendation.

24. The system as in claim 21, wherein the server is configured to recall window data including at least one of: shape; size; color scheme; type of room; size of room; and information on other window treatments in order to provide the recommendation.

25. The system as in claim 21, wherein the server is configured to at least one of automatically generate the recommendation; generate the recommendation upon a review; and generate the recommendation upon an event.

26. The system as in claim 25, wherein the event comprises a change in ownership of the premises.

27. The system as in claim 25, further comprising another server for ordering a window treatment fitted according to the window data.

28. The system as in claim 25, wherein the server is further configured to:
determine whether a user account associated with the premises exists; and
create a new user account associated with the premises if it is determined that there has been a change in ownership.

29. The system as in claim 21, wherein the server is a merchant server.

30. The system as in claim 21, wherein the recommendation is generated by a recommendation engine.

31. The system as in claim 21, wherein the virtual representation comprises a depiction rendered using the window data and adapting window treatment data to correlate to an appearance of the window treatment selection with the window selection; wherein the depiction is adjusted according to lighting and/or shading, each based on an amount of natural light at different times of a day coming through the window selected by the user.

32. The system as in claim 21, wherein the recommendation is based on a measurement of a nearest obstruction left and/or right of the window selection.

33. The system as in claim 21, wherein the window data further comprises information whether any children are living in or expected to enter the premises.

34. The system as in claim 21, wherein the window data has the metadata pertaining to all levels of the hierarchical data structure, wherein the hierarchical data structure includes: an address of the premises of the customer; a list of room identifiers linked to the address for identifying each room of the premises; a list of window identifiers uniquely identifying each window of a total number of windows associated with and linked to a particular room from the list of room identifiers linked to the address of the premises; and the window treatment data linked to a particular window identifier from the list of window identifiers linked to the address of the premises.

35. A user accessible system for a customer to obtain a custom window treatment, the system comprising:
a merchant server in communication with a window database comprising previously-stored window data for at least one window of a premises for the customer, the previously-stored window data being maintained for future re-use, the merchant server also in communication with a window treatment database comprising window treatment data for at least one window treatment; wherein the window database is a hierarchical data structure having multiple levels of linked data so that the window data has metadata pertaining to at least one level of the hierarchical data structure, wherein the hierarchical data structure includes at least one of the following: an address of the premises of the customer; a list of room identifiers linked to the address for identifying each room of the premises; a list of window identifiers uniquely identifying each window of a total number of windows associated with and linked to a particular room from the list of room identifiers linked to the address of the premises; and the window treatment data linked to a particular window identifier from the list of window identifiers linked to the address of the premises;
wherein the list of window identifiers includes selections corresponding to the room selected in a manner according to the hierarchical data structure created for the premises; and
a client device of the customer in communication with the merchant server to provide a graphical user interface, wherein the graphical user interface is configured for:
presenting at least one window from the window database to the customer;
receiving a window selection from the customer;
presenting a window treatment option to the customer for the window selection;
receiving a window treatment selection from the customer; and
communicating the window treatment selection to the merchant server;
wherein the merchant server is configured for:
recalling the previously-stored window data;
generating a virtual representation using a same scale of the previously-stored window data for the received window selection from the customer and of the window treatment option according to the previously-stored window data; and
communicating the virtual representation to the client device for display in the graphical user interface to the customer.

36. The user accessible system as in claim 35, wherein the virtual representation further comprises a depiction of the window selection.

37. The user accessible system as in claim 36, wherein the previously-stored window data includes a photograph of the window selection.

38. The user accessible system as in claim 35, wherein the merchant server is further configured for at least one of:
generating a quote and placing an order for the window treatment selection.

39. The user accessible system as in claim 35, wherein the merchant server is further configured to:

communicate with a mobile device configured for receiving and storing window data collected at the premises of the customer;
receive the window data from the mobile device.

40. The user accessible system as in claim 39, wherein the mobile device is configured for receiving the window data from an electronic measurement device configured for recording measurement data at the premises of the customer and transmitting the measurement data thereto.

41. The user accessible system as in claim 35, further comprising a recommendation engine for making a recommendation of a window treatment to the customer.

42. The user accessible system as in claim 41, wherein the recommendation is based on a change in ownership of the premises.

43. The user accessible system as in claim 35, further comprising at least one window identifier, each window identifier for being disposed at a window of the premises and associated with window data for that window.

44. The user accessible system as in claim 35, wherein window data comprises at least one of: a measurement; molding information; a shape; a type; a style; a direction in which the at least one window opens; a manufacturer; a location of the at least one window in at least one of the wall, a room and the premises; a number of windows; associated hardware; mounting information; environment information; identity of an associated window identifier; and at least one photograph.

45. The user accessible system as in claim 35, wherein the measurement comprises a nearest obstruction left and/or right of the window selection.

46. The user accessible system as in claim 35, herein the virtual representation comprises a depiction rendered using the window data and adapting window treatment data to correlate to an appearance of the window treatment selection with the window selection.

47. The user accessible system as in claim 46, wherein the depiction is adjusted according to lighting and/or shading, each based on an amount of natural light at different times of a day coming through the window selected by the customer.

48. The user accessible system as in claim 35, further comprising a server for ordering a window treatment based on the specification.

49. The user accessible system as in claim 35, wherein the window data further comprises information whether any children are living in or expected to enter the premises.

50. The user accessible system as in claim 35, wherein the window data has the metadata pertaining to all levels of the hierarchical data structure, wherein the hierarchical data structure includes: an address of the premises of the customer; a list of room identifiers linked to the address for identifying each room of the premises; a list of window identifiers uniquely identifying each window of a total number of windows associated with and linked to a particular room from the list of room identifiers linked to the address of the premises; and the window treatment data linked to a particular window identifier from the list of window identifiers linked to the address of the premises.

51. A method for providing a virtual window treatment decorating interface, the method comprising:
generating a graphical user interface with a merchant server in communication with a window database comprising window data descriptive of at least one window of a premises of a customer and a window treatment database comprising window treatment data for at least one window treatment; wherein the window database is a hierarchical data structure having multiple levels of linked data so that the window data has metadata pertaining to at least one level of the hierarchical data structure, wherein the hierarchical data structure includes at least one of the following: an address of the premises of the customer; a list of room identifiers linked to the address for identifying each room of the premises; a list of window identifiers uniquely identifying each window of a total number of windows associated with and linked to a particular room from the list of room identifiers linked to the address of the premises; and the window treatment data linked to a particular window identifier from the list of window identifiers linked to the address of the premises;
wherein the list of window identifiers includes selections corresponding to the room selected in a manner according to the hierarchical data structure created for the premises; and
communicating the graphical user interface to a client device to provide the graphical user interface to the customer, the graphical user interface:
presenting at least one window from the window database to the customer;
receiving a window selection from the customer;
presenting window treatment options to the customer for each window selection;
receiving at least one window treatment selection from the customer for the window selection; and
communicating each window treatment selection to the merchant server;
the merchant server:
receiving each window treatment selection and generating a virtual representation using a same scale of window data for the received window selection from the customer and the window treatment data for the received window retreatment selection from the customer; and
communicating the virtual representation to the client device for display to the customer through the graphical user interface.

52. The method as in claim 51, further comprising:
generating the virtual representation using a photograph of the window selection with a rendering of the window treatment selection.

53. The method as in claim 51, further comprising:
recommending a window treatment to the customer based upon a change in ownership of the premises.

54. The method as in claim 51, further comprising:
associating the at least one window of the premises of the customer with a user account.

55. The method as in claim 54, further comprising:
retrieving previously-stored window data for at least one window associated with the user account.

56. The method as in claim 51, wherein the virtual representation comprises a depiction rendered using the window data and adapting window treatment data to correlate to an appearance of the window treatment selection with the window selection; wherein the depiction is adjusted according to lighting and/or shading, each based on an amount of natural light at different times of a day coming through the window selected by the customer.

57. The method as in claim 51, further comprising:
receiving a purchase request at the merchant server and ordering a window treatment for the window treatment selection.

58. The method as in claim 51, wherein the window data further comprises information whether any children are living in or expected to enter the premises.

59. The method as in claim 51, wherein the window data has the metadata pertaining to all levels of the hierarchical data structure, wherein the hierarchical data structure includes: an address of the premises of the customer; a list of room identifiers linked to the address for identifying each room of the premises; a list of window identifiers uniquely identifying each window of a total number of windows associated with and linked to a particular room from the list of room identifiers linked to the address of the premises; and the window treatment data linked to a particular window identifier from the list of window identifiers linked to the address of the premises.

60. The method as in claim 51, wherein the window data comprises a measurement of a nearest obstruction left and/or right of the window selection.

* * * * *